United States Patent
Munakata

(12) 
(10) Patent No.: US 6,335,747 B1
(45) Date of Patent: Jan. 1, 2002

(54) IMAGE FORMING APPARATUS, ADJUSTMENT METHOD AND MEMORY MEDIUM

(75) Inventor: Atsushi Munakata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/200,873

(22) Filed: Nov. 27, 1998

(30) Foreign Application Priority Data

Nov. 28, 1997 (JP) ............................................. 9-328318
Nov. 9, 1998 (JP) ........................................... 10-317548

(51) Int. Cl.$^7$ ........................ B41J 2/385; G01D 15/06; G03G 15/01
(52) U.S. Cl. ...................................... 347/116; 399/301
(58) Field of Search ........................ 399/301, 31, 32, 399/40, 15; 347/19, 115, 116, 118

(56) References Cited

U.S. PATENT DOCUMENTS

| | | | |
|---|---|---|---|
| 4,878,063 A | | 10/1989 | Katerberg |
| 4,963,899 A | | 10/1990 | Resch, III |
| 5,070,369 A | * | 12/1991 | Mahoney et al. ........... 399/301 |
| 5,191,361 A | * | 3/1993 | Abe ............................ 347/116 |
| 5,373,355 A | * | 12/1994 | Ando et al. .................. 399/301 |
| 5,909,235 A | * | 6/1999 | Folkins ................... 347/116 X |
| 5,982,402 A | * | 11/1999 | Yoshikawa et al. .......... 347/116 |
| 6,011,575 A | * | 1/2000 | Haneda .................. 347/118 X |

FOREIGN PATENT DOCUMENTS

| | | |
|---|---|---|
| EP | 0701180 A | 3/1996 |
| JP | 7-072698 | 3/1995 |

* cited by examiner

*Primary Examiner*—Sandra Brase
(74) *Attorney, Agent, or Firm*—Fitzpatrick, Cella, Harper & Scinto

(57) ABSTRACT

An image forming apparatus includes plural image forming units for respectively forming images of plural colors in a superposed manner on a recording material in a case of adjusting the relation position of the images of plural colors on a recording material. A first image forming unit among the plural image forming units forms a line of a first color on the recording material, while a second image forming unit forms a line of a second color on the recording material such as to cross the line of the first color at a non-perpendicular angle. An adjustment unit adjusts the relative positions of the images of plural colors on the recording material, based on input information.

46 Claims, 20 Drawing Sheets

$\lambda = 140*0.55/0.5-140=14$

IMAGE FORMING APPARATUS, ADJUSTMENT METHOD AND MEMORY MEDIUM

BACKGROUND OF THE INVENTION

1. Field of the Invention

The present invention relates to an image forming apparatus, an adjustment method and a memory medium therefor. For example, an image forming apparatus capable of correcting color shift when forming a color image, a control method and memory medium therefor.

2. Related Background Art

Full-color image forming apparatus based on an electrophotographic process or ink jet process are becoming popular, and color shift is a factor contributing to deteriorating the quality of the image formed by such apparatus. A full-color image is usually formed by superimposing three or four color component images, and the positions of such color component images have to precisely matched on the recording sheet.

Also in the image forming apparatus of an electrophotographic process, there is known a configuration having image forming stations of different colors arranged in the conveying direction of the recording sheet, in order to achieve high-speed image formation. In such configuration, an error in the distance between the image forming stations results naturally in the color shift. Consequently, the color shift is corrected by controlling the timing of light emission of the exposure means for forming latent images of different colors. More specifically, in case an LED array is employed as the exposure means, the color shift correction is achieved, in the sub scanning direction, by the timing of light emission, and, in the main scanning direction, by displacing the LED to be used in the unit of each pixel.

Also in case of exposure means for forming the latent images by laser beam scanning, the method of correction is different according to the configuration of the polygon mirror to be employed. In a configuration having a polygon mirror for each color component, the color shift correction is achieved in the sub scanning direction by controlling the timing of light emission of the laser beam corresponding to each color and the phase angle of the polygon mirror, and, in the main scanning direction, by controlling the timing of start of latent image formation after the laser beam detection. On the other hand, in a configuration in which a polygon mirror is used commonly for different colors, the correction in the sub scanning direction is achieved in the unit of a pixel, by controlling the timing of light emission of the laser and changing the face of the polygon mirror to be used for latent image formation. Also the correction in the main scanning direction is same as in the type having plural polygon mirrors.

Also as the color shift is generated over the entire image area if the images of the different color components are mutually inclined, there is sometimes provided a mechanism for adjusting the inclination of the laser beam path with respect to the photosensitive drum.

On the other hand, there is widely employed the full-color image forming apparatus of an ink jet process in which an image is formed by a line or by a predetermined band width at a time, by reciprocating plural recording heads corresponding to the different color components in the main scanning direction. In such configuration, the color shift is generated if an error is involved in the distance of the recording heads corresponding to the different color components and in the position thereof in the sub scanning direction. In such case, the color shift correction is achieved in the main scanning direction by controlling the timing of start of recording of each recording head, and, in the sub scanning direction, by shifting the nozzle to be used for recording in the unit of a pixel.

The full-color image forming apparatus is provided, as explained in the foregoing, with adjustment means for absorbing the color shift resulting for example from the precision of component parts in the manufacture, and is shipped from the manufacturing site after adjustment so as to minimize the color shift. It is however difficult to always maintain the state of color shift after shipment, for example because of the following reasons:

(i) dimensional change dependent on temperature;
(ii) dimensional change resulting from distortion dependent for example on the location of installation;
(iii) change dependent on length of time;
(iv) kind of recording paper; and
(v) replacement of parts.

Following solutions have been proposed for the color shifts resulting from the above-mentioned causes:

(1) The color shift in the output image is read by an image reading device and is corrected. This method requires an image reading device, and is effective for example in a copying apparatus equipped with an image reading device, but cannot be applied to a single image forming apparatus not equipped with such image reading device;

(2) The color shift is estimated from the output image or the latent image in the image forming apparatus itself and is corrected according to the result of such estimation. This method however inevitably involves a higher cost, since there are required estimation means for calculating the result of estimation and correction means for correcting the color shift; and (3) The operator recognizes the color shift in the output image and enters information into the image forming apparatus so as to minimize the color shift. This method can suppress the increase in the cost of the apparatus, but the operator is required to be capable of correcting recognizing even a slight color shift. In general, the recognizable shift of dots or lines formed on the recording sheet is 0.2 mm or larger, corresponding to a shift of about 5 pixels in a resolution of 600 dpi.

SUMMARY OF THE INVENTION

An object of the present invention is to provide an image forming apparatus capable of easily and precisely correcting the color shift, and an adjustment method and a memory medium therefor.

Other objects of the present invention, and the features thereof, will become fully apparent from the following detailed description which is to be taken in conjunction with the attached drawings.

DETAILED DESCRIPTION OF THE PREFERRED EMBODIMENTS

In the following, the image forming apparatus of the present invention, and the adjustment method and memory medium therefor will be explained in detail by embodiments shown in the attached drawings.

[Configuration]

Figure 1:
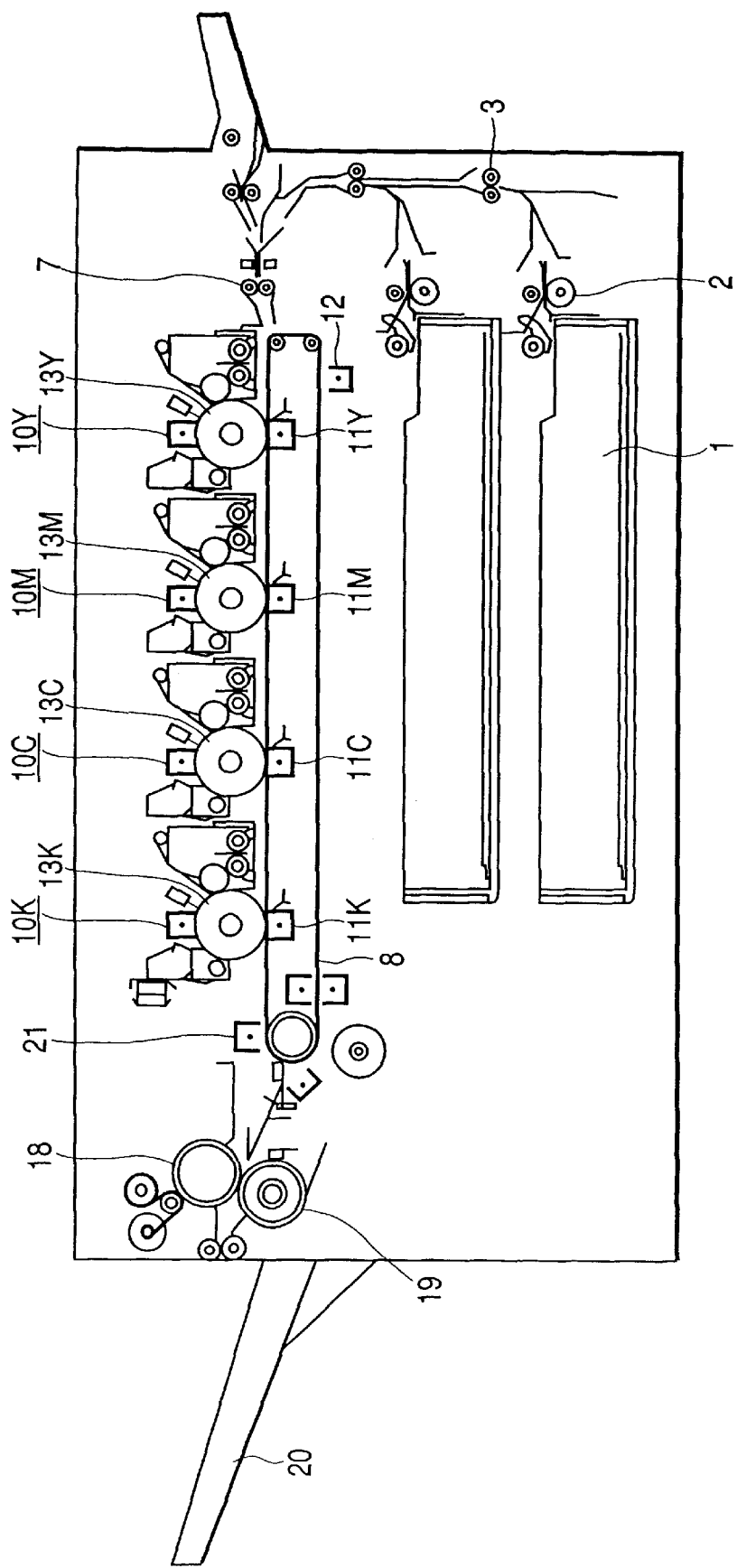
FIG. 1 is a schematic view showing an example of the configuration of the image forming apparatus embodying the present invention.

A full-color image forming apparatus of the electrophotographic process shown in FIG. 1 forms a full-color image by superposing toner of four colors, namely magenta, cyan, yellow and black.

Image forming units (image forming means) 10Y, 10M, 10C and 10K form color component images respectively of cyan, magenta, yellow and black. A transfer belt (recording material bearing member) 8 conveys a recording sheet (recording material) and transfers the color component images onto such recording sheet.

A recording sheet housed in a cassette 1 is separated one by one by a feeding roller 2, conveyed by convey rollers 4 to registration rollers 7 for correcting skew-feed in the sheet, and is advanced to a transfer belt 8 at a predetermined timing. The transfer belt 8, composed of a sheet of an insulating resinous material, is charged by a charger 12, thereby attracting the recording sheet.

During the feeding of the recording sheet, latent images corresponding to the different color component images are formed on photosensitive drums 13Y, 13M, 13C and 13K according to image information transmitted from an apparatus such as a computer (not shown), and are developed into toner images with the toners of respective color components. The recording sheet advanced from the registration rollers 7 in synchronization with the toner images formation is electrostatically attracted by the transfer belt 8, and the toner images are transferred by transfer chargers 11Y, 11M, 11C and 11K onto the recording sheet when it passes under color forming units 10Y, 10M, 10C and 10K.

Figure 2:
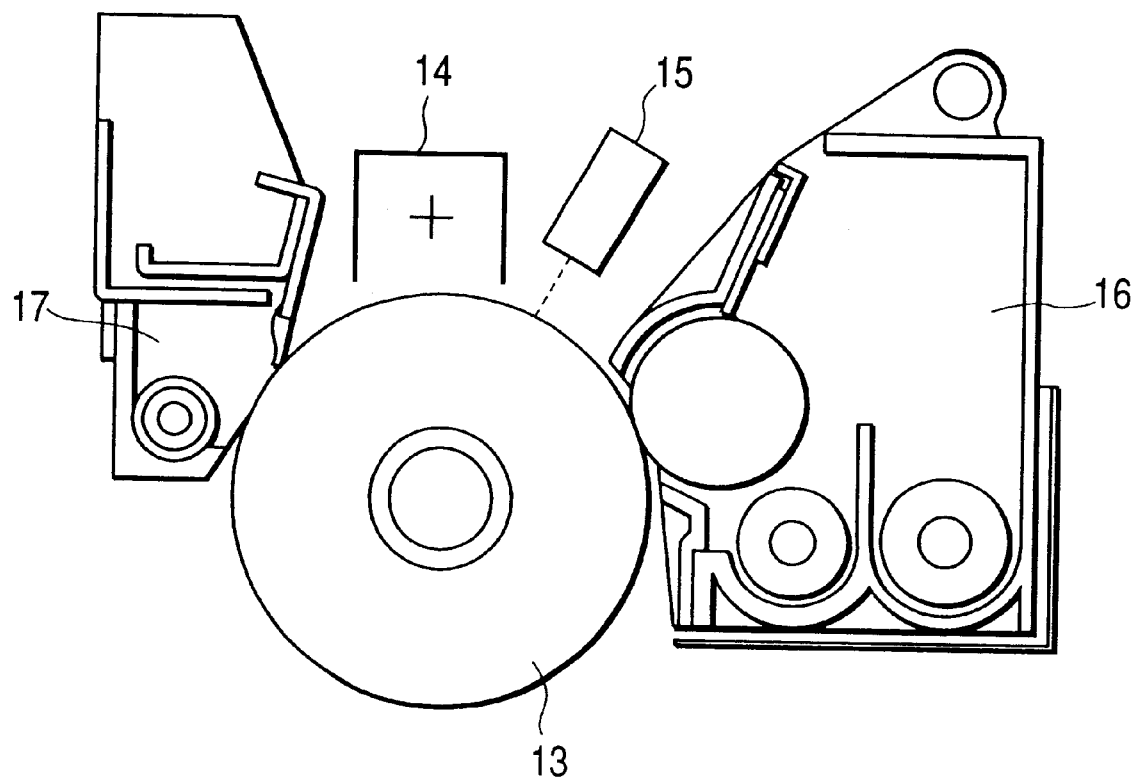
FIG. 2 is a detailed view showing the principal part of an image forming unit in the image forming apparatus shown in FIG. 1.

Each of the image forming units is provided, as exemplified in FIG. 2, with a charger 14, an LED exposure array 15, a developer 16 and a cleaner 17 around a photosensitive drum 13. The toner images of a color is formed on the photosensitive drum 13 by the electrophotographic process.

The recording sheet bearing the transferred toner images of four colors is separated from the transfer belt 8 by a separation charger 21, and the toner images are thermally fused and fixed to the recording sheet by paired fixing rollers 18, 19, whereby a full-color image is completed. The recording sheet bearing the fixed toner images is discharged onto a sheet discharge tray 20 protruding to the exterior of the apparatus.

The LED array 15 is provided with light-emitting elements with a resolution of 600 dpi in the main scanning direction. In the present embodiment, the resolution is 600 dpi in the main scanning direction and 1200 dpi in the sub scanning direction, and the distance (set value) between the adjacent photosensitive drums is 100 mm, while the conveying speed (process speed) of the recording sheet is 100 mm/s.

[Control unit]

Figure 7:
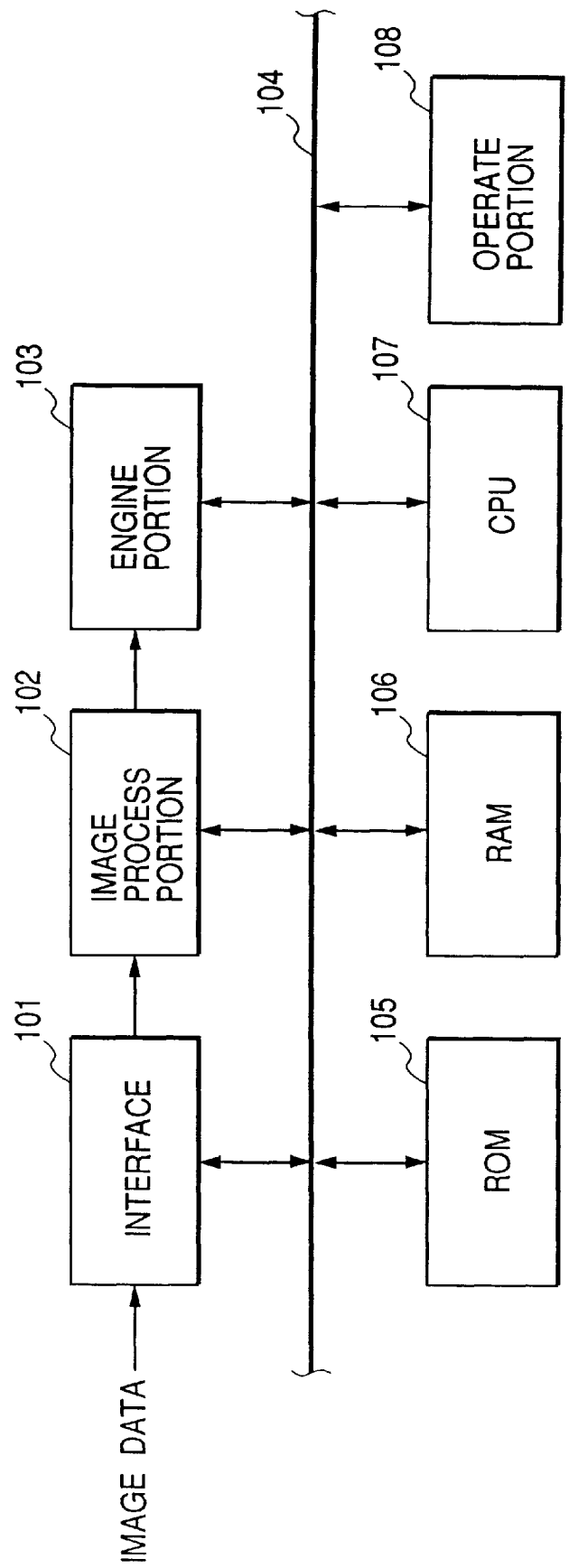
FIG. 7 is a block diagram showing an example of the configuration of a control unit of the image forming apparatus shown in FIG. 1.

FIG. 7 is a block diagram showing an example of configuration of the control unit, in which an interface 101 receives the image data, representing the image to be printed, from a personal computer or the like. The image data received by the interface 101 are subjected, in an image process unit 102, to an image process matching the image forming apparatus such as luminance-density conversion, masking/UCR process, gamma correction etc., and are then transferred to an engine unit 103 for forming a full-color image on the recording sheet, based on the image data.

The function and the process in these interface 101, image process unit 102 and engine unit 103 are controlled by a CPU 107 through a bus 104, based on a control program, control conditions, a processing program and process conditions stored in a ROM 105 serving as a memory medium. A RAM 106 is used as a work memory by the CPU 107, and a part of the RAM 106 is constructed as a non-volatile memory for example with a back-up battery, for storing a part of the operating conditions and the image processing conditions of the image forming apparatus. An operation unit 108 is provided with numeral keys, touch keys and a display unit such as an LCD, and serves to display the operating status and operating conditions of the image forming apparatus and to enter various instructions and data by the operator. The CPU 107 controls the function and process of the image forming apparatus according to the instructions and data inputted into the operation unit 108.

[Correction of color shift]

In the following there will be explained the procedure of correcting the color shift in the sub scanning direction.

For a distance P between the adjacent photosensitive drums and a process speed V, the exposure by the LED arrays 15 corresponding to the different color component images of Y, M, C and K can be theoretically started with a delay time P/V. In practice, however, the start timing of the exposure has to be corrected because the color shift is generated in the sub scanning direction by various errors such as the error of the distance P between the adjacent photosensitive drums from the set value, the positional relationship between the photosensitive drum 13 and the LED array 15 in sub scanning direction in each station, the inclination of the optical axis of the LED array 15 with respect to the vertical direction etc.

The color shift in the sub scanning direction can be corrected by adjusting the timing of light emission of the LED array 15 for other color components, with respect to a reference color (for example yellow). The color shift state remains unchanged as long as the error in the distance P from the set value, the positional relationship between the photosensitive drum 13 and the LED array 15, the inclination of the optical axis of the LED array 15 etc. are maintained. However, the factors such as the error in the distance P from the set value, the positional relationship between the photosensitive drum 13 and the LED array 15, the inclination of the optical axis of the LED array 15 etc. show variation by the distortion of the apparatus, the temperature, the time-dependent change as explained in the foregoing, so that the color shift state fluctuates in the course of use of the apparatus.

Figure 8:
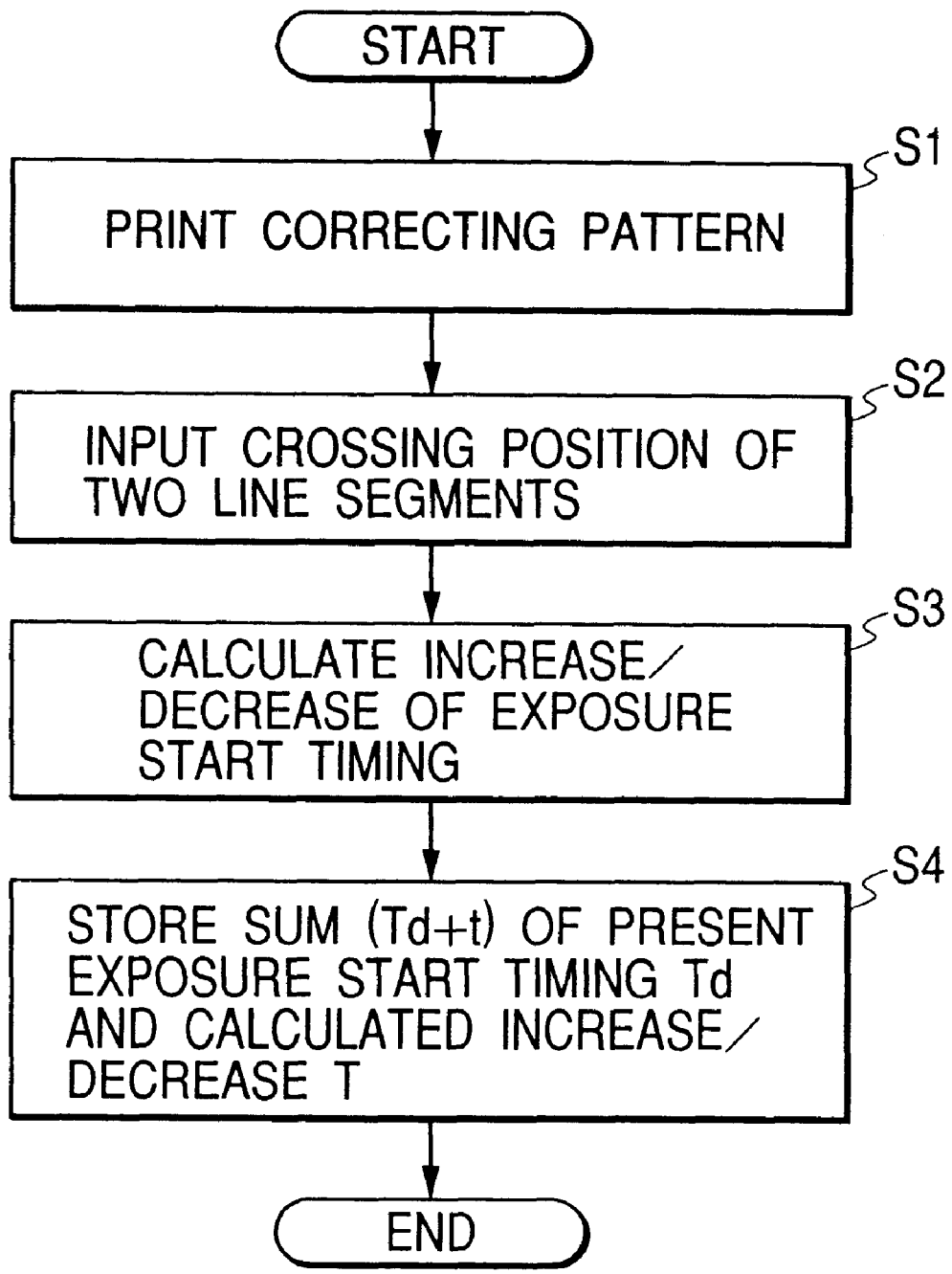
FIG. 8 is a flow chart showing the procedure of the color shift correction of the present invention.

In the following there will only be considered the shift between the Y and K images for the purpose of simplicity of explanation. It is assumed that the shift between the Y and K images is adjusted to zero at the shipment of the apparatus and that the K image is shifted by 50 μm toward the rear in the conveying direction of the recording sheet, and the correcting method in such case will be explained with reference to FIG. 8, which is a flow chart showing an example of the correcting process to be executed by the CPU 107 functioning as the adjustment means.

Figure 3:
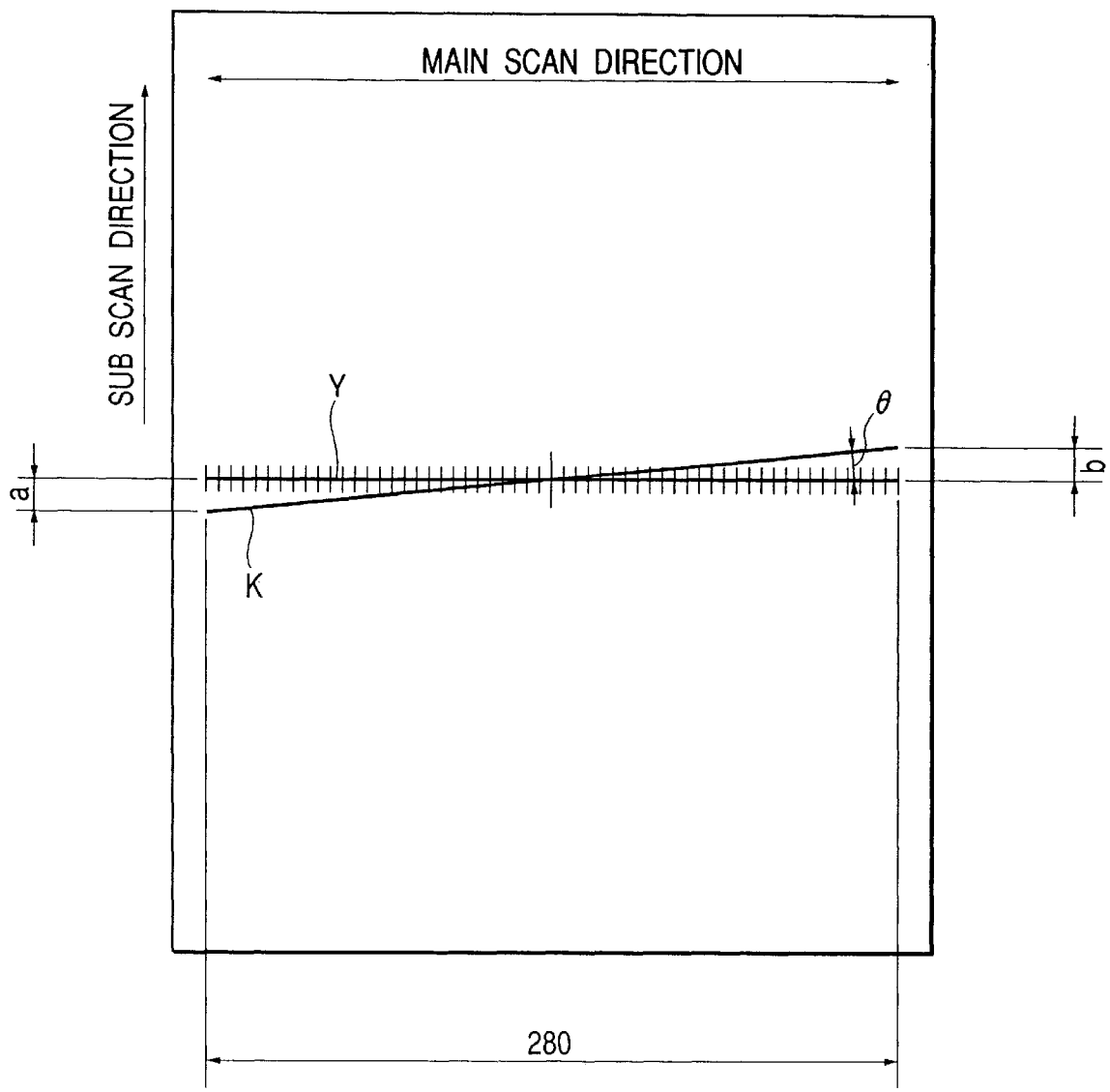
FIG. 3 is a view showing an example of a correction pattern to be used for correcting color shift.

In case of executing correction of the color shift, the color shift correction mode is selected in the operation unit 108, whereupon a correction pattern as shown in FIG. 3, stored in advance in the ROM 105, is printed on a recording sheet (step S1). As shown in FIG. 3, a Y line section, which is the line of the reference first color, is printed in the main scanning direction, and a K line section, which is the line of the second color, is recorded with a small angle to the Y line section. More specifically, the Y line section has a length of 280 mm in the main scanning direction, while the K line section has, with respect to the Y line section, an inclination of 1 mm represented by the sum of distances a, b in the sub scanning direction. If the color shift is adjusted to zero, in the printed correction pattern shown in FIG. 3, the distances a, b are mutually equal and become 0.5 mm, and the center of the K line section coincides with that of the Y line section.

Figure 4:
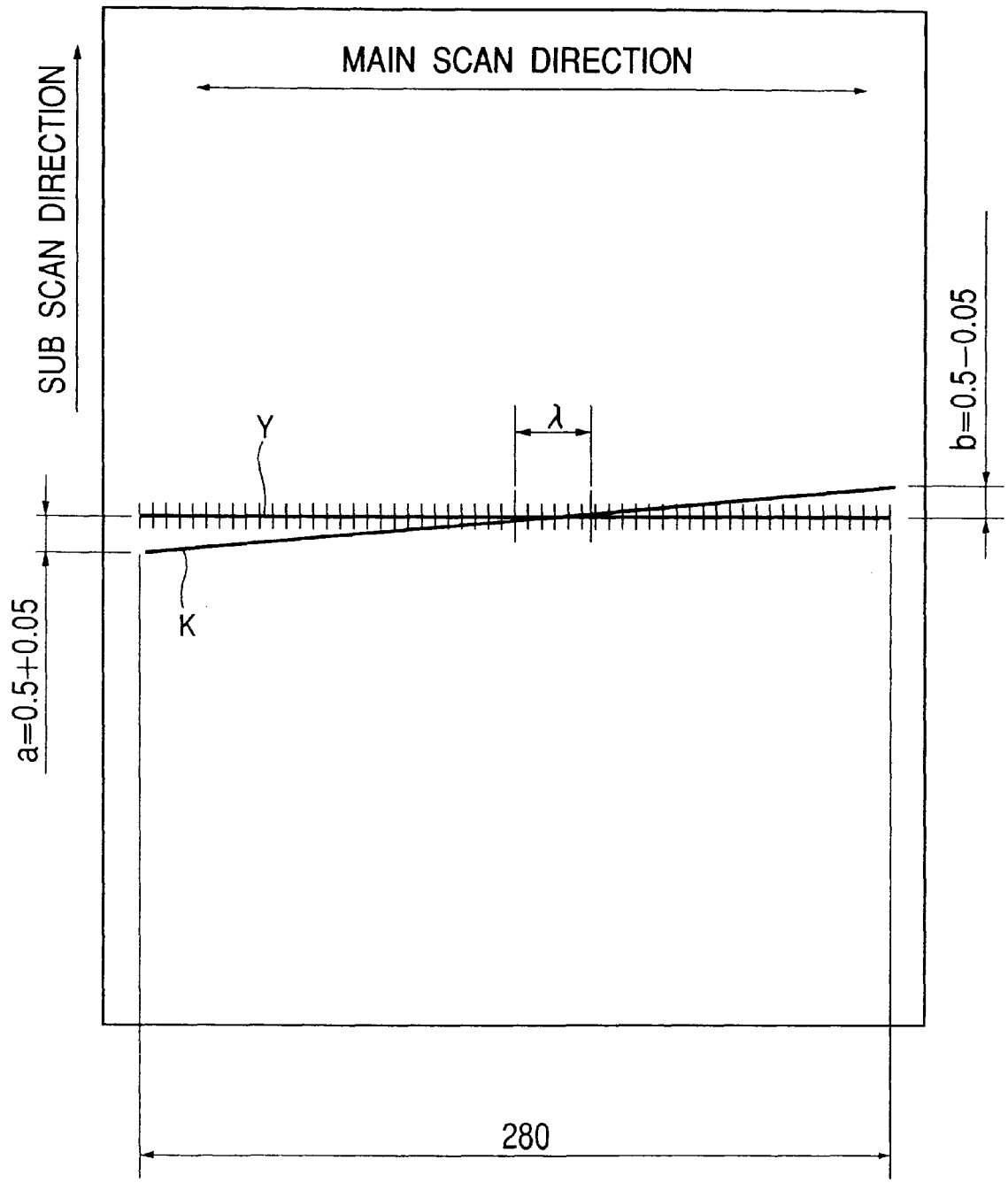
FIG. 4 is a view showing an example of the correction pattern formed in case of a color shift.
Figure 5:
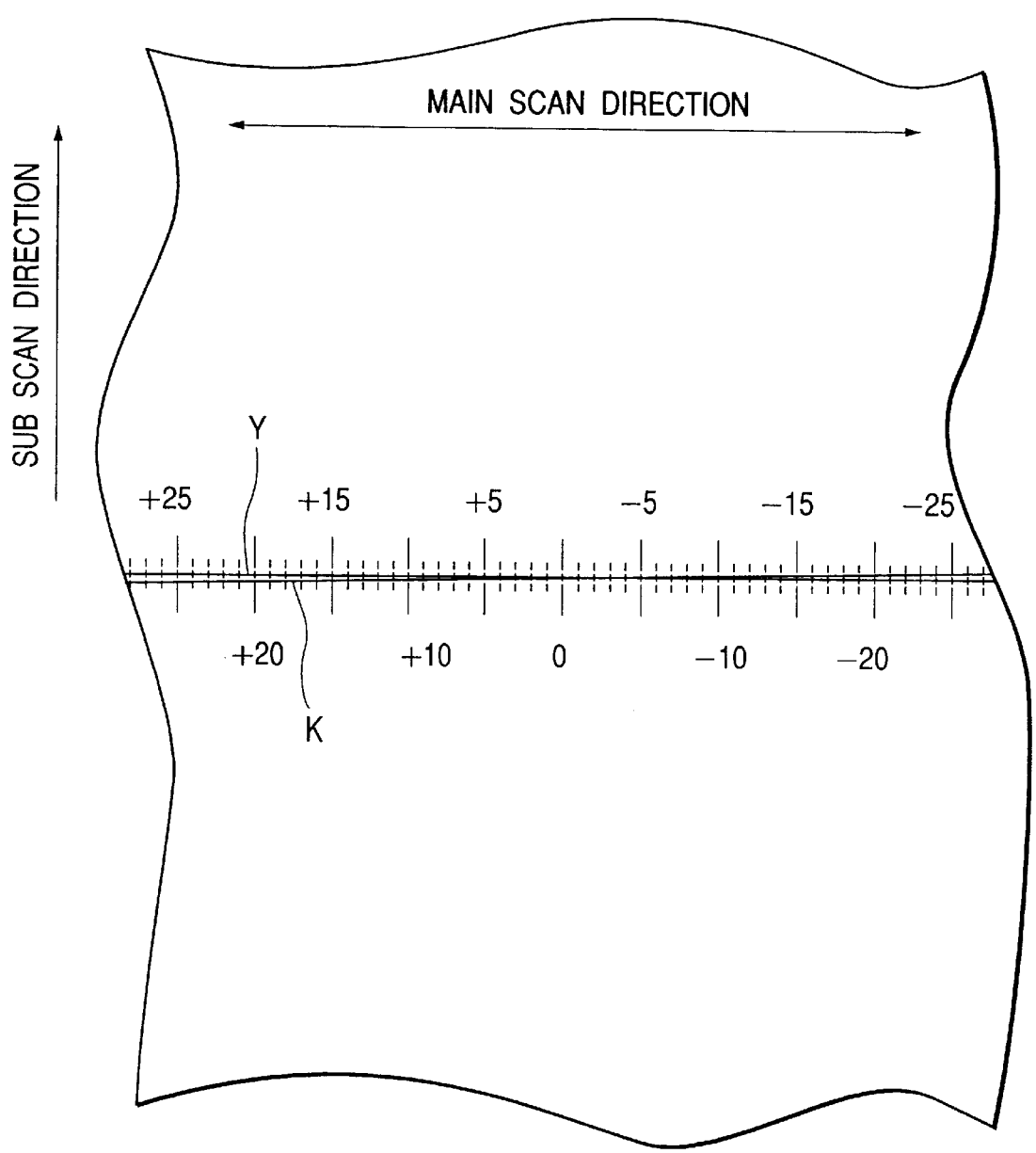
FIG. 5 is a magnified view of the correction pattern.

If the K image is shifted by 50 μm, with respect to the Y images, toward the rear in the conveying direction of the recording sheet, the outputted correction pattern assumes a form shown in FIG. 4, in which the crossing point of the both lines is shifted by 14 mm to the right with respect to the conveying direction of the recording sheet. The operator judges the crossing point of the lines, by visually inspecting the outputted correction pattern. FIG. 5 is a magnified view of the vicinity of the crossing point of the correction pattern, in which the Y line section of the reference color is formed as a scale of a predetermined pitch, with a number 0 at the center and plus and minus figures respectively in the left-hand side and right-hand side in the conveying direction of the recording sheet. Referring to this scale, the operator reads a figure closest to the crossing point and enters such figure in the operation unit 108 (step S2). The pitch of the scale is for example selected as 2 mm.

If the operator judges that the crossing point is at "−5", namely that the crossing point is shifted by 10 mm (more correctly 14 mm) from to the right from the center, a figure "−5" indicating the shift is inputted into the image forming apparatus. The reading error of the operator will be discussed later. Based on the inputted negative figure d indicating the shift, it can be identified that the K image is shifted, with respect to the Y image, toward the rear in the conveying direction of the recording sheet, so that, for reducing the color shift, there is decreased a time Td from the start of exposure for the Y image to the start of exposure for the K image. The amount of increase or decrease of the time Td is calculated as follows (step S3):

$$t = d \cdot U/(L \cdot S)$$

wherein:

U: a gradation in scale (mm)

L: length of Y line section (mm)

S: process speed (mm/s).

In the present embodiment, since U=2 mm, L=280 mm and S=100 mm/s, the value t for d=−5 becomes −5× 2/(280× 100)=−0.357 ms. By representing the difference between the start timing of exposure for the Y image and that for K image prior to correction by Td1 (ms), the new Td (ms) is given by Td=Td1−0.357 (ms), which is stored in the non-volatile portion of the RAM 106 (step S4). The CPU 107 controls the start timing of exposure according to the new Td, so that the color shift between the Y image and the K image is corrected from 50 μm to 50−35.7=14.3 μm.

Figure 6:
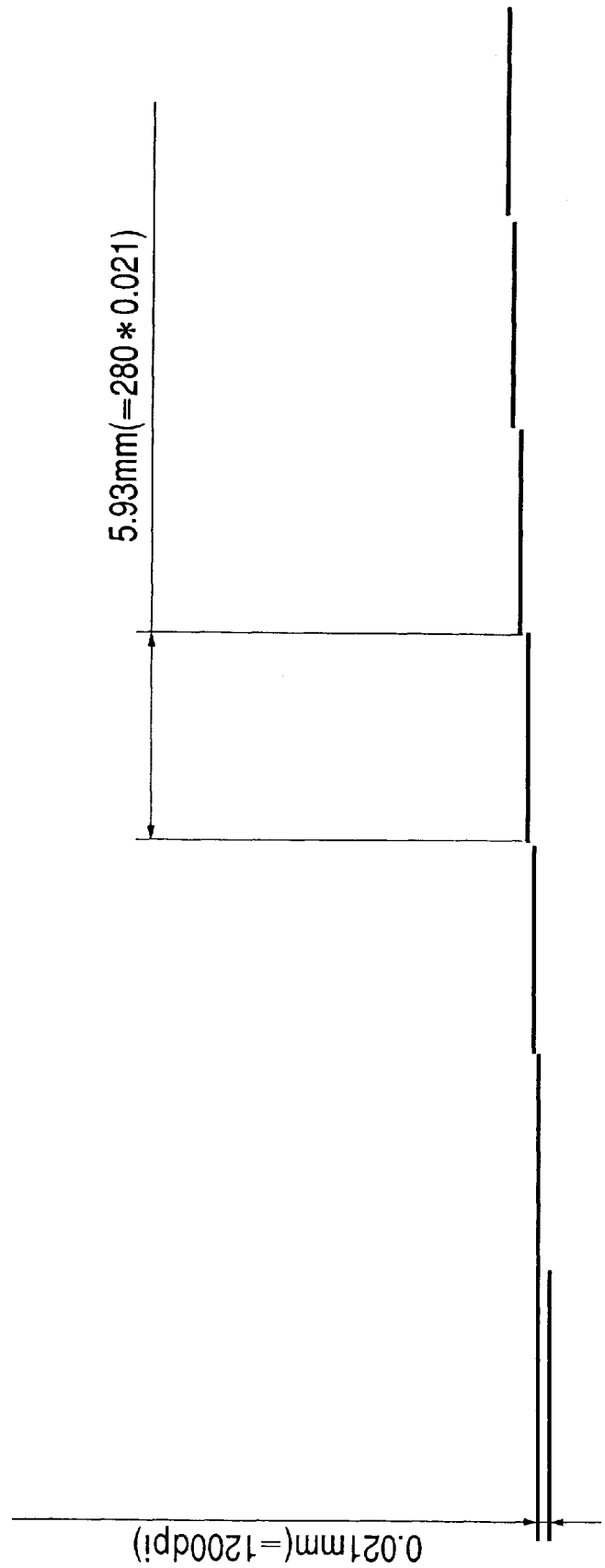
FIG. 6 is a schematic view showing an inclined line in the correction pattern.

It is naturally desirable that the operator can correctly specify the crossing point, but in fact there exists a resolution determined by the pitch of elements of the LED array 15 and the lighting control therefor. In the present embodiment, as the light-emitting elements has a pitch of 600 dpi and a resolution of 1200 dpi in the sub scanning direction as explained in the foregoing, the line of the correction pattern is constructed from a combination of short line sections as shown in FIG. 6. The K line section, which appears as a smooth inclined line, is in fact composed of short line sections parallel to the Y line section, having a length of about 6 mm and printed with a pitch of about 21 μm corresponding to 1200 dpi. Consequently, a reading error of ±6 mm in reading the crossing point of the line constituted by the line sections of about 6 mm provides a color shift of ±21 μm. On the other hand, the limit of visual recognition of the color shift is about 200 μm as explained in the foregoing. For a color shift of about 50 μm, it is difficult to identify not only such shift but also the direction thereof, and it will be apparent that the above-described method allows to correct the color shift with a high precision.

Figure 17:
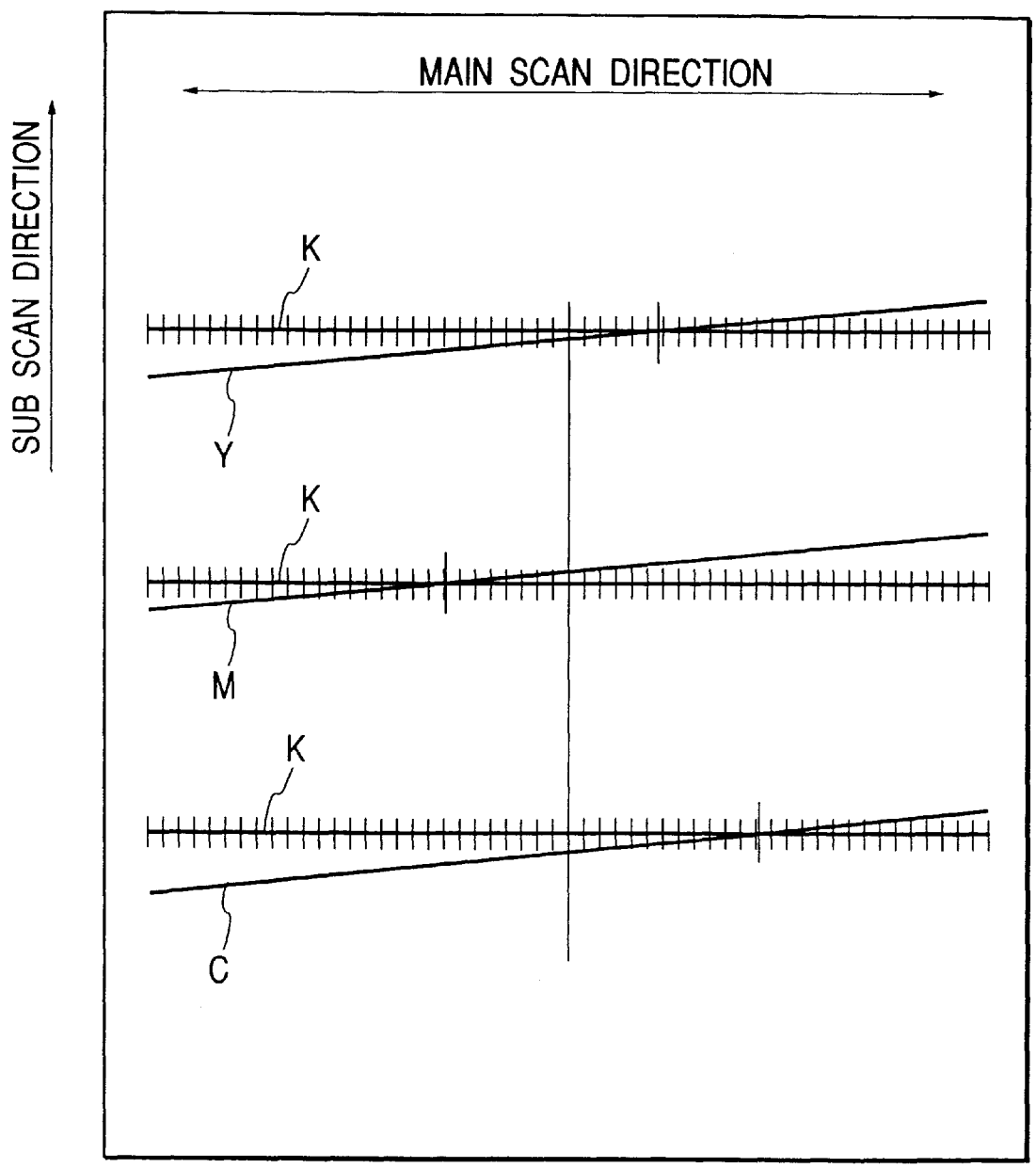
FIGS. 17 and 18 are views showing other examples of the correction pattern.

In the foregoing there has been explained a method of correcting the color shift between the Y and K images by a single correction pattern, but it is naturally possible to correct the color shift between the Y and M images or Y and C images in a similar manner. It is naturally possible also to print three sets of correction patterns on a recording sheet, for correcting the color shift among four colors. The correction pattern in such case is shown in FIG. 17. In case of forming the color image with four colors, it is necessary to adjust the print positions of three colors with respect to a reference color, so that a line in each of the three sets of correction patterns is printed with a same reference color. Any color may be selected as the reference color, but, in consideration of the visibility, black color is preferably selected as the reference color as shown in FIG. 17.

In case the color image is formed by three colors Y, M and C, the color shift among three colors can be corrected by printing only one set of correction pattern, with different crossing angles for the lines of two colors, with respect to the line of the reference color.

Figure 18:
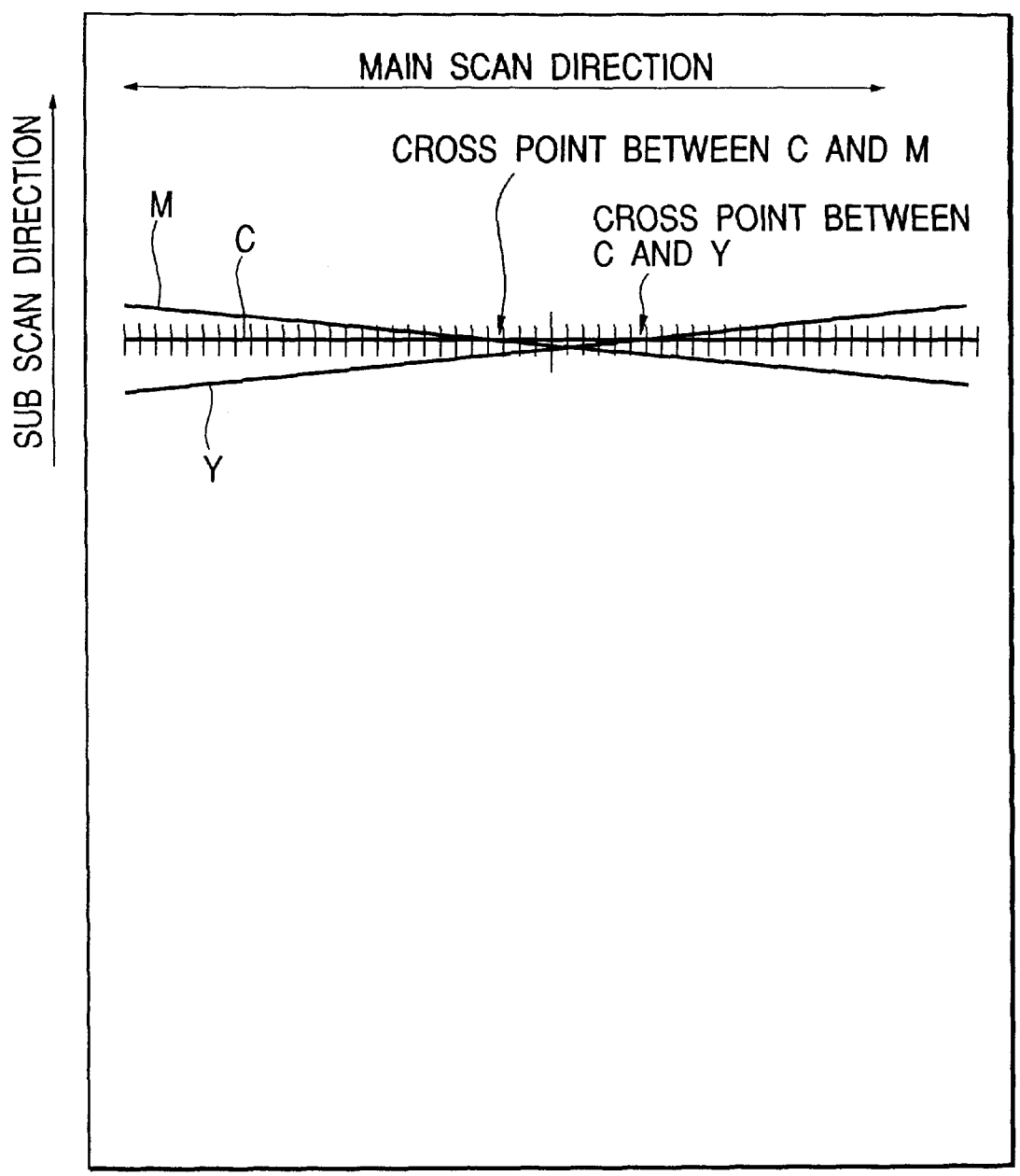

Such correction pattern is shown in FIG. 18. In the illustrated example, the Y and M line sections have different crossing angle with respect to the C line section taken as the reference color.

Such single set of correction pattern allows to identify the crossing points between the Y and C line sections and between the M and C line sections.

If the Y line section perpendicularly crosses the K line section, the amount or color shift is not reflected on the information on the crossing point of the both line sections. For this reason, the angle θ (FIG. 3) is preferably not equal to 90°. The angle θ between the Y and K line sections preferably does not exceed 45°, in order that the amount of the color shift is sensitively reflected on the variation in the position of the crossing point of the line sections.

Figure 19:
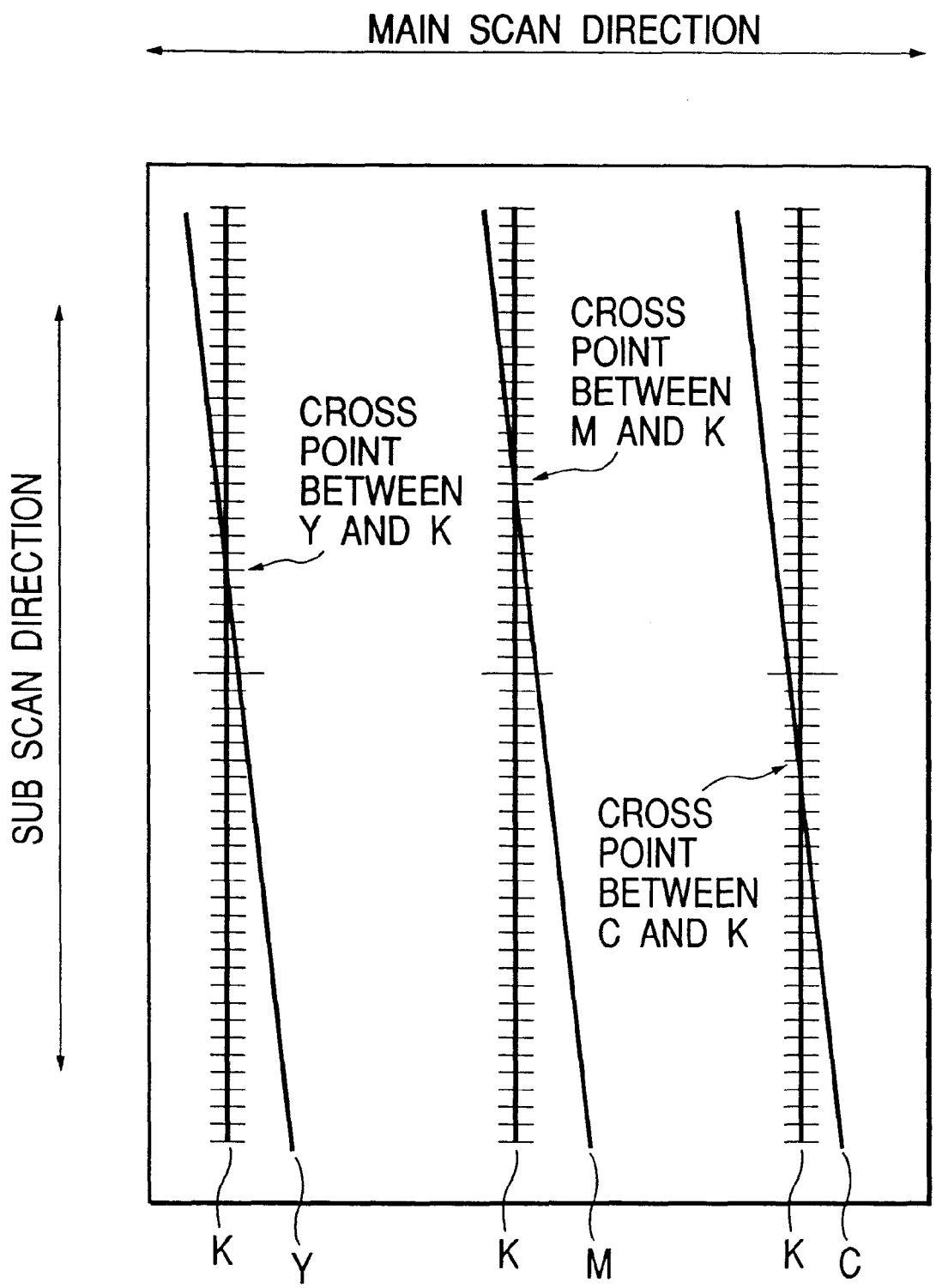
FIG. 19 is a view showing an example of the pattern for color shift correction in the main scanning direction.

The color shift correction may be achieved not only in the sub scanning direction but in the main scanning direction by rotating the correction pattern to be printed by 90°. In the present embodiment, however, since the print position in the main scanning direction can only be adjusted by the pitch of the light-emitting elements employed for image formation, the precision of correction is limited to a half of the resolution of 600 dpi, namely about ±21 μm. FIG. 19 shows an example of the correction pattern to be used for positional adjustment in the main scanning direction.

[Second embodiment]

In the following there will be explained an image forming apparatus constituting a second embodiment of the present invention and a method employed therein. In the present embodiment, components equivalent to those in the first embodiment will be represented by corresponding symbols and will not be explained further.

Figure 9:
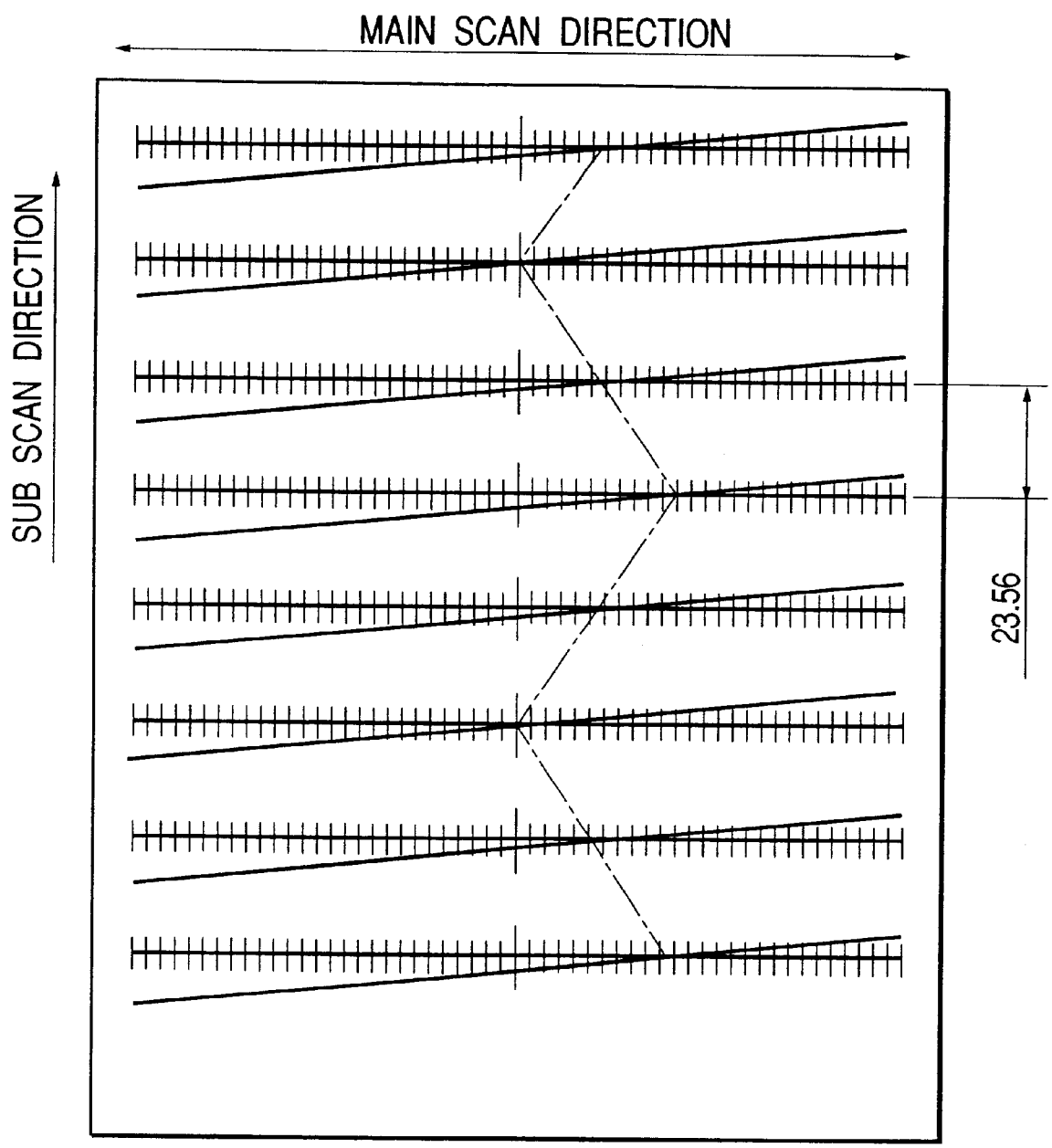
FIG. 9 is a schematic view showing an example of the correction pattern in a second embodiment of the present invention.

In the foregoing first embodiment, the color shift is corrected at a point in the image, but correction can be achieved with an improved precision by setting plural crossing points in the correction pattern and utilizing such crossing points for the correction. FIG. 9 shows a correction pattern having plural crossing points, to be employed in the present embodiment. However an illustrated chain line connecting the crossing points is an imaginary line which is not actually recorded.

In the present embodiment, it is assumed that the peripheral length of the driving roller for the transfer belt 8 is correctly set, and the distances between the photosensitive drums are set mutually equal, so that the color shift is not generated among the different color component images though the conveying speed of the transfer belt 8 may vary by the eccentricity of the driving roller for the transfer belt 18.

In the correction pattern shown in FIG. 9, the pitch of the reference lines is selected as π×D/4, wherein D is the diameter of the photosensitive drum 13. If the diameter D of the photosensitive drum 13 is 30 mm, the pitch of the lines is about 23.56 mm, and eight lines in total are drawn. The measurement of the color shift with this correction pattern covers two peripheral length of each photosensitive drum 13 and indicates the color shifts in states separated in succession by 90° from a certain angular position. Consequently the measured color shift represents the color shift averaged over two turns of the photosensitive drum 13 and does not depend on the rotation state of the photosensitive drum 13 at the start of formation of the correction pattern. The average should be at least over one turn of the photosensitive drum 13.

The operator enters the eight crossing points on the correction pattern in a similar manner as in the first embodiment. The CPU 17 calculates the color shifts from the information of the inputted crossing points, and determines the new timing Td of exposure by averaging the color shifts. Otherwise, the operator may enter the average of the eight crossing points.

This correcting method, taking the rotation of the photosensitive drum 13 into consideration, provides the following advantages.

As the rotating speed of the photosensitive drum 13 shows a slight fluctuation (unevenness in rotation), there is generated a certain shift even within each color component image (reproduced as a local elongation or contraction of image). For this reason, if the color shift is measured at a point on the photosensitive drum 13 or at points not equally divided thereon, the color shift after the correction depends on the position where the color is measured because of the influence of local elongation or contraction in each color component image.

Figure 10:
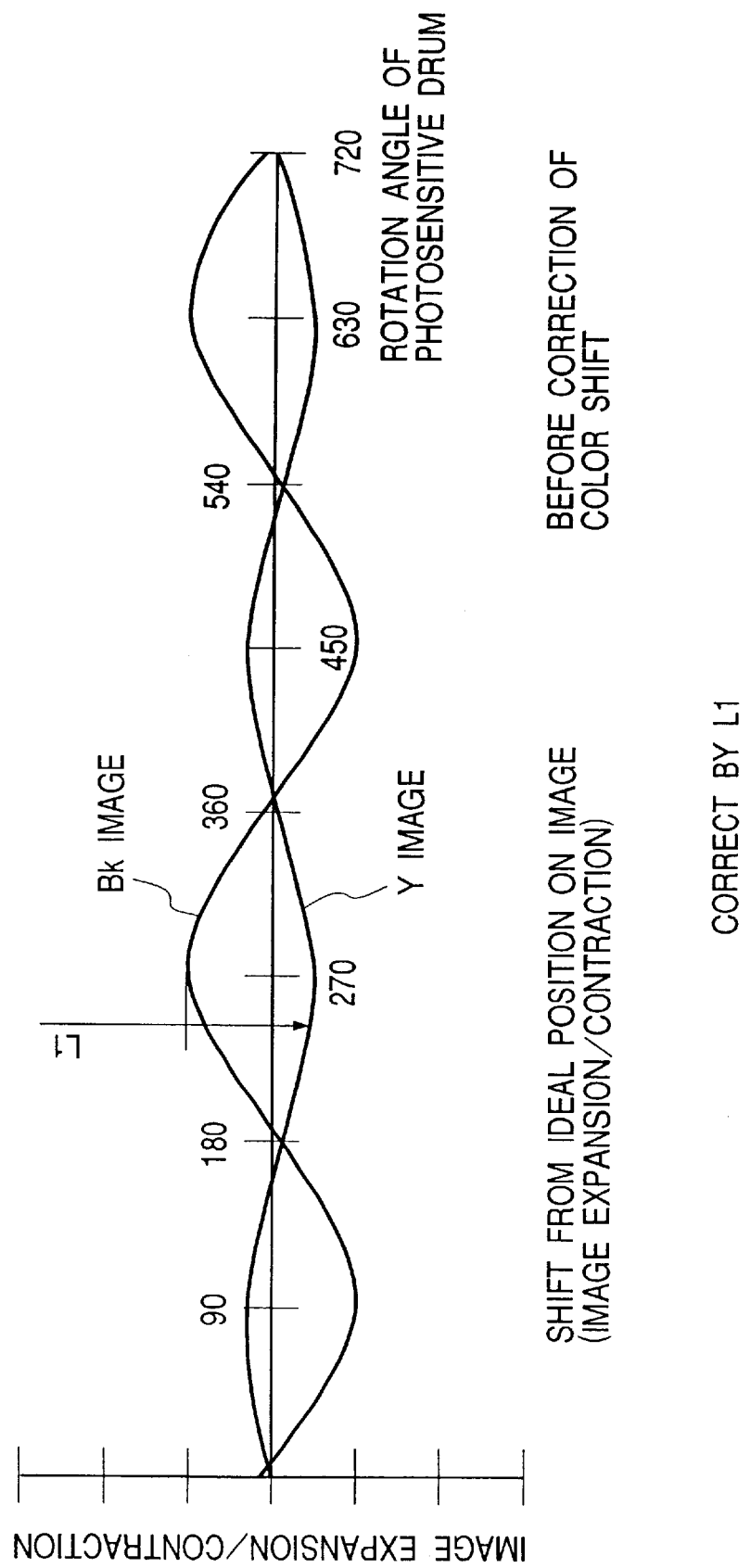
FIG. 10 is a view showing extension and contraction of an image.
Figure 11:
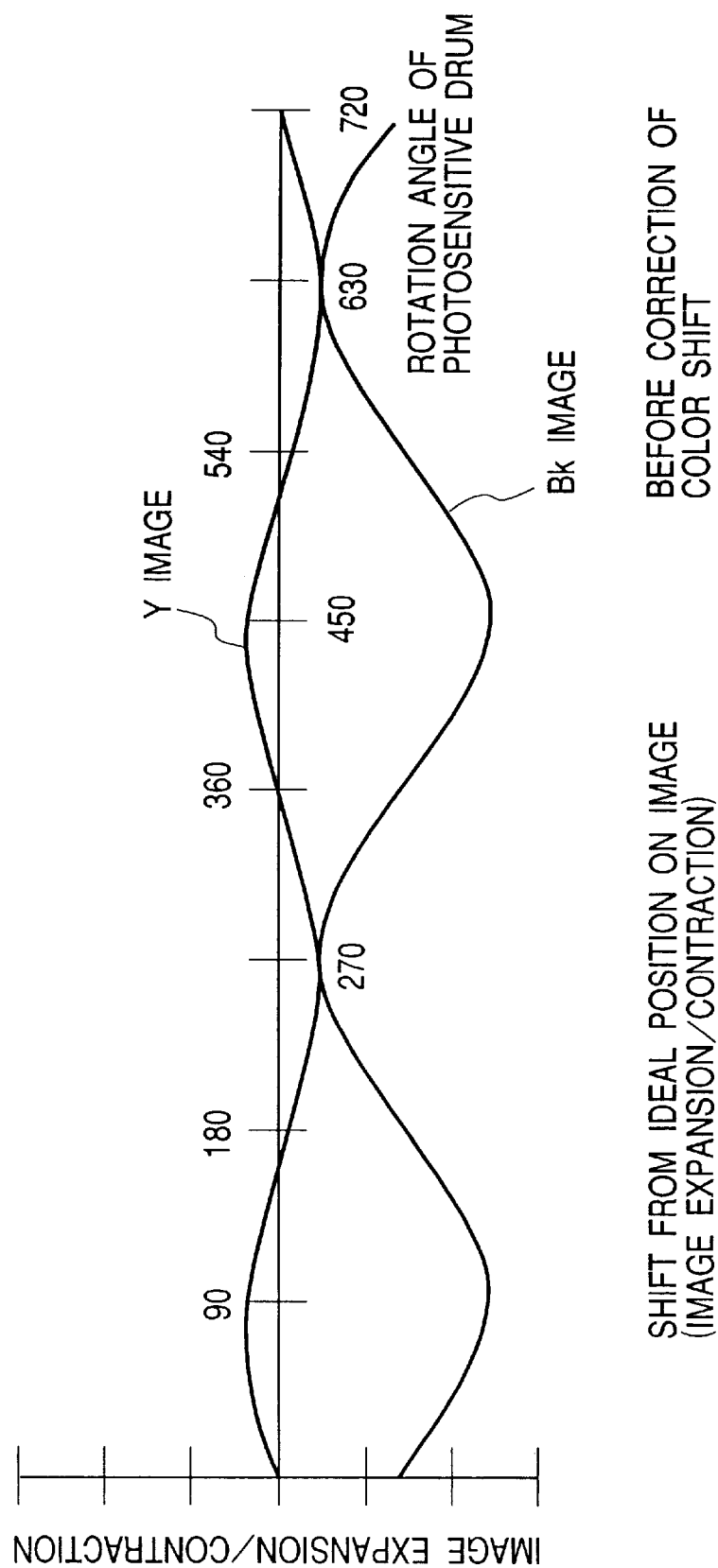
FIG. 11 is a view showing the color shift after correction not considering image extension or contraction.

For example, if the color shift is measured in a position L1 shown in FIG. 10 (a position with a large local elongation or contraction), the average color shift increases over the entire image after the correction, as shown in FIG. 11.

Figure 12:
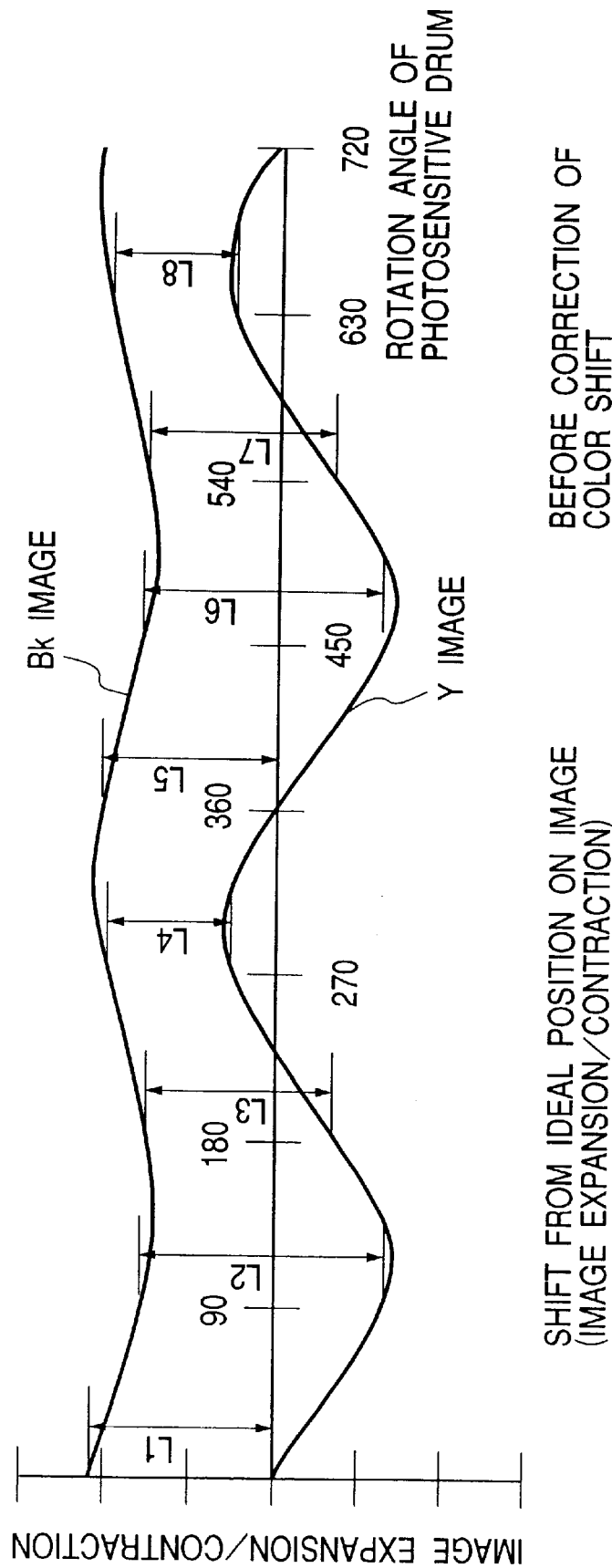
FIG. 12 is a view showing the color shift correction in the second embodiment.
Figure 13:
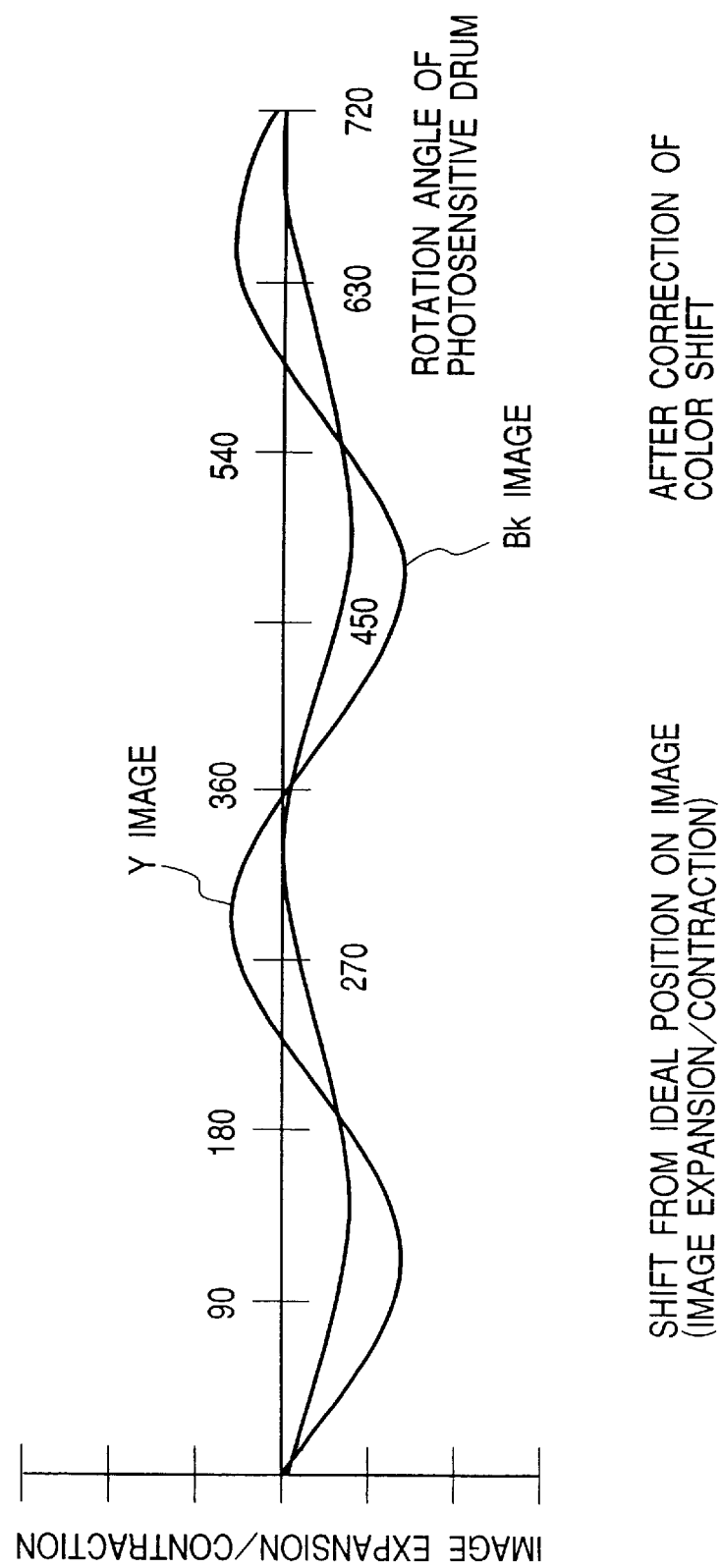
FIG. 13 is a view showing the color shift after correction of the second embodiment.

On the other hand, in case the color shift is obtained by measurements in eight positions L1 to L8 of a predetermined pitch as shown in FIG. 12 and averaging the measured values, the local elongation or contraction resulting from the unevenness in rotation of the photosensitive drum 13 is minimized by averaging, so that the average of elongation/contraction and color shift can be minimized over the entire image area as shown in FIG. 13.

[Third embodiment]

Figure 14:
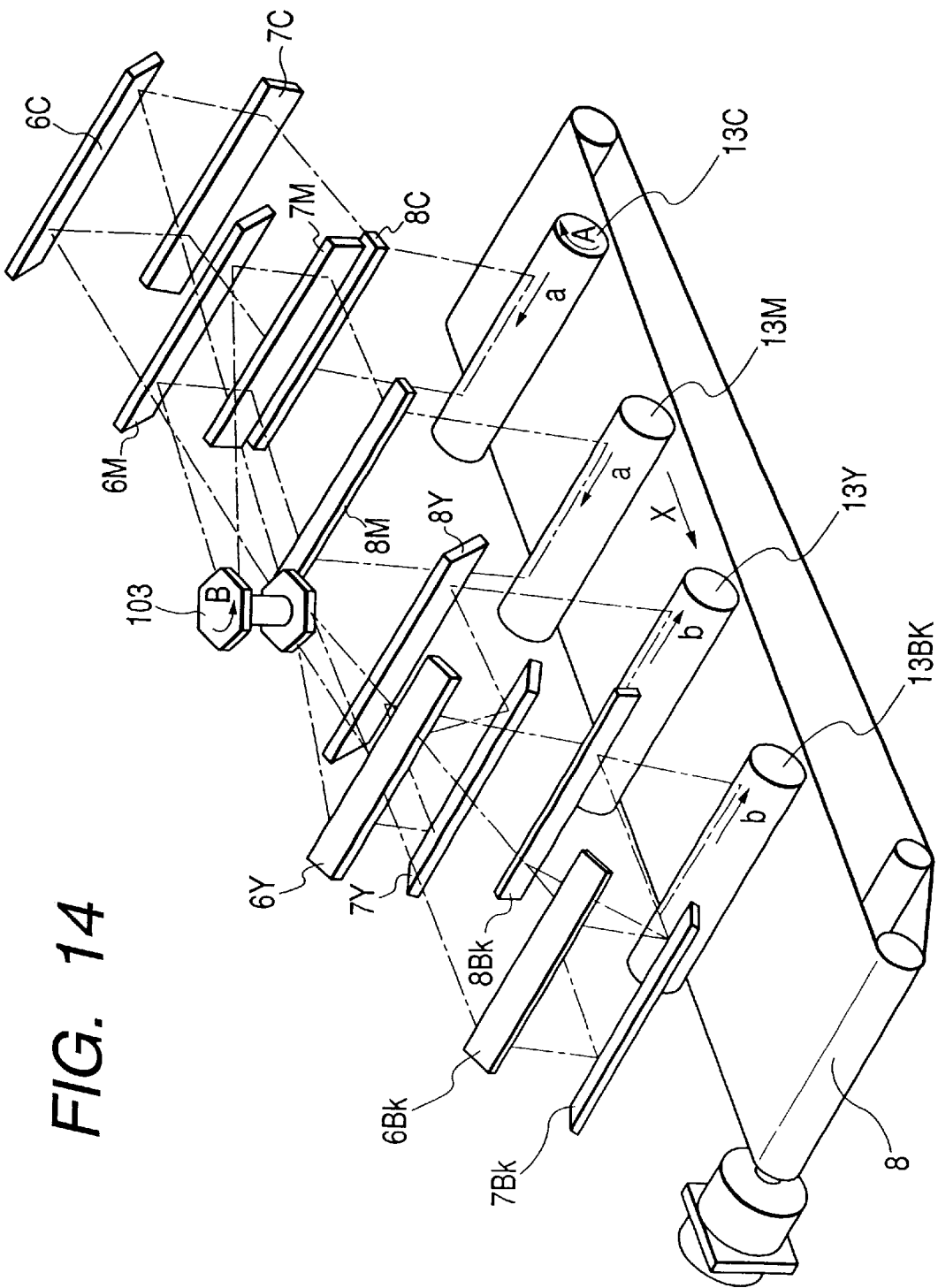
FIG. 14 is a schematic view showing the configuration of a laser scanning optical system in an image forming apparatus.

In the foregoing embodiments, the present invention has been explained relative to the image forming apparatus of a type in which the photosensitive drum 13 is exposed to the light from the LED array 15, but it is also applicable to the image forming apparatus of a type having a laser scanning optical system in which a laser beam is put into a scanning motion by a polygon mirror to scan the photosensitive drum, as shown in FIG. 14. In FIG. 14, there are shown a polygon mirror 103 and mirrors 6 to 8 for guiding the laser beams to the photosensitive drums 13 of respective colors.

In the image forming apparatus of the laser scanning type, the image position in the sub scanning direction can be adjusted by electrically controlling the emission timing of the laser beam. However, as the latent image formation can only be started within a certain angular range of the polygon mirror 103, the recording position can be varied in the sub scanning direction only in the unit corresponding to the resolution. In case a polygon mirror is provided independently for the image forming station of each color, the image position can be adjusted more finely by controlling the phase angle between the polygon mirrors.

On the other hand, in the main scanning direction, the adjustment is made by varying the time from the beam detection in each image forming station to the start of light emission for image formation, so that the image position can be varied in the unit of a pixel or even in a smaller unit. Consequently, it is possible to precisely correct the color shift in the main scanning direction or in the sub scanning direction as in the first embodiment, based on the value inputted by the operator, indicating the color shift.

[Fourth embodiment]

In the foregoing embodiments, the present invention has been applied to the full-color image forming apparatus of electrophotographic process, but the present invention is likewise applicable to a full-color image forming apparatus of serial scan type, in which a recording head of three or four colors is made to reciprocate in the main scanning direction of the recording sheet to form the image by a line or by a predetermined band width at a time, such as an ink jet printer.

Figure 15:
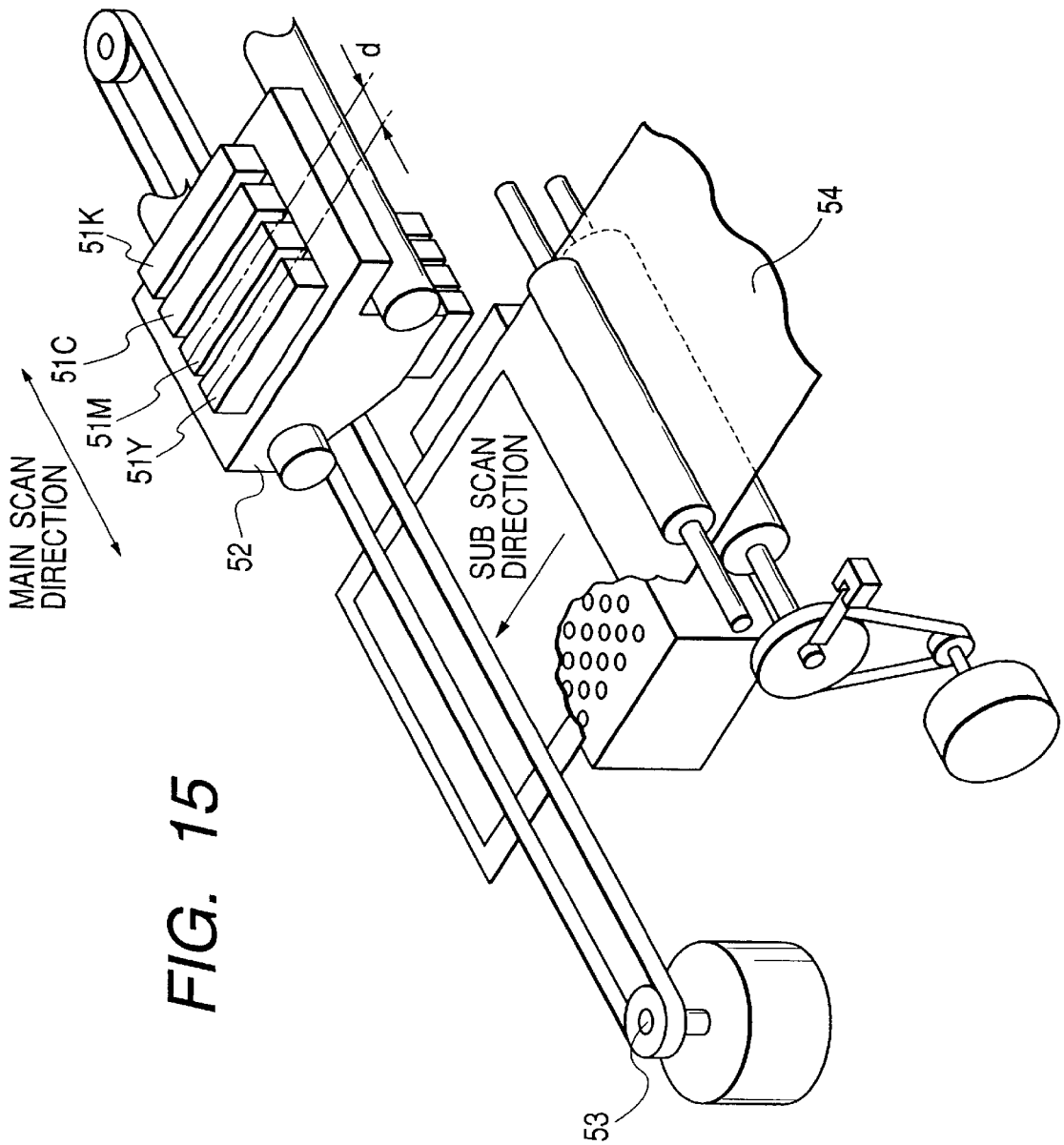
FIG. 15 is a schematic view showing the configuration around a recording head in the image forming apparatus.

An ink jet printer shown in FIG. 15 forms a full-color image by a predetermined band width at a time, by moving, in the main scanning direction, recording heads 52 separated by a predetermined pitch d in the main scanning direction and adapted to respectively discharge Y, M, C and K inks in the pixel recording period, and, in the non-recording period, returning the recording heads 52 and at the same time conveying a recording sheet 54 in the sub scanning direction by the recording width. The distance of the nozzle arrays for the inks of different colors in the recording heads 52 in the main scanning direction is dependent on the dimensional precision of the recording heads 52, but the image position can be adjusted in the unit of a pixel or even in a smaller unit, by electrically regulating the timing of ink discharge of each nozzle array with respect to the reference color. On the other hand, the color shift in the sub scanning direction may also be generated by the dimensional precision of the recording heads 52, but the correction is possible in the unit of a pixel by selecting the nozzles to be used for pixel recording.

Consequently, it is possible to precisely correct the color shift in the main scanning direction and in the sub scanning direction as in the first embodiment, based on the value inputted by the operator, indicating the color shift.

Also in the ink jet printer shown in FIG. 15, the color shift in the main scanning direction is not influenced by the eccentricity of a driving pulley 53 for driving the recording heads 52 in the main scanning direction, if the distance d (for example 30 mm) of the nozzle arrays for different colors in the recording heads 52 is selected the same as the peripheral length of the driving pulley 53. It is assumed that each nozzle array has 600 nozzles, and that the resolution in the sub scanning direction determined by the pitch of the nozzle array is selected as 600 dpi. In the main scanning direction, a resolution of 1200 dpi is achieved by controlling the discharge timing of the nozzles.

Figure 16:
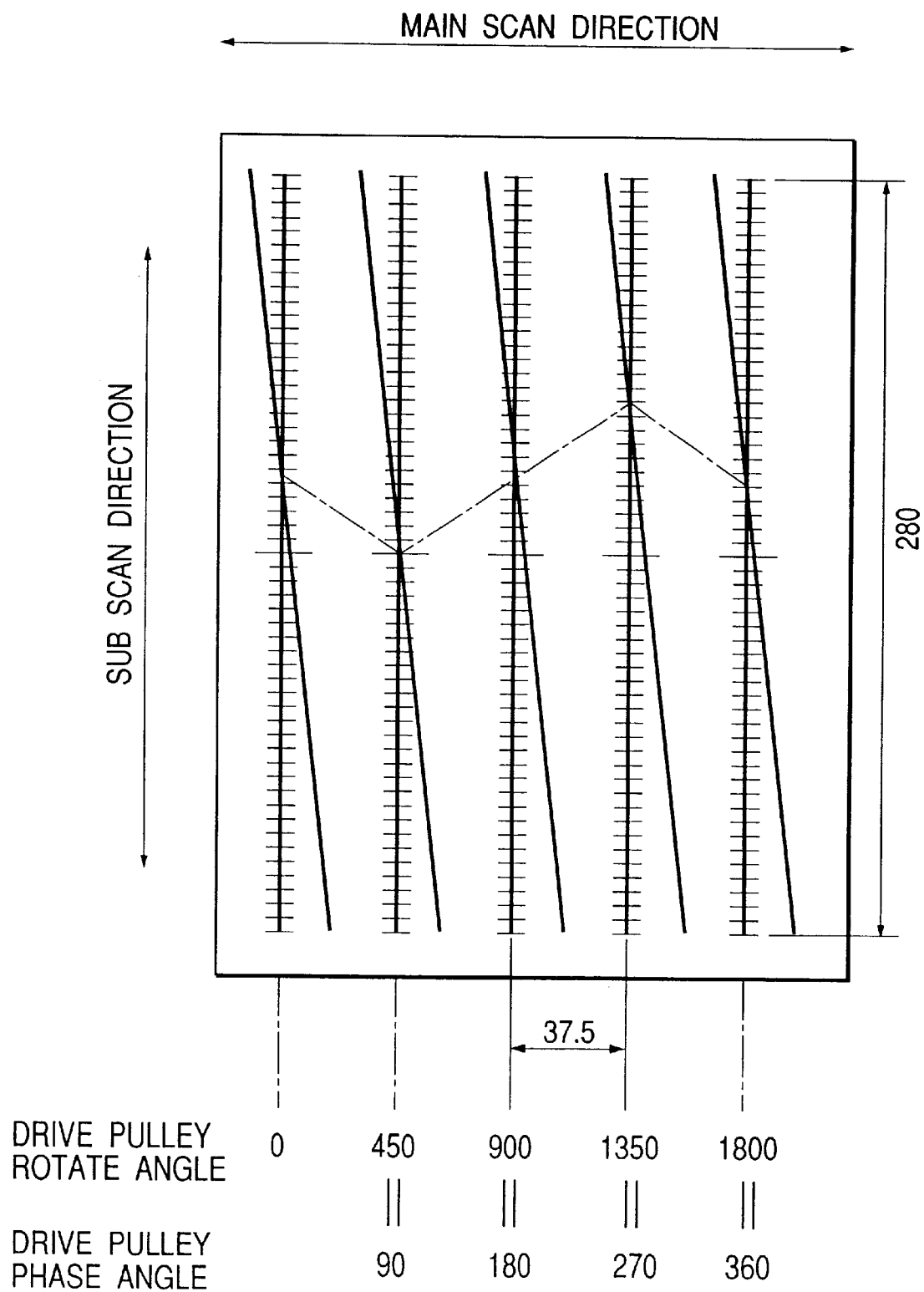
FIG. 16 is a view showing a correction pattern to be employed in an image forming apparatus provided with a recording head.

In the following there will be explained an example of color shift correction in the above-described configuration, utilizing a correction pattern shown in FIG. 16. In FIG. 16, a chain line connecting the crossing points is an imaginary line and is not actually recorded.

In the present apparatus having a band width of 25.4 mm, the recording head 52 has to make 12 reciprocating cycles in order to recording the correction pattern shown in FIG. 16, in which five reference lines are drawn in the main scanning direction, with a pitch of 37.5 mm. Figures shown in the lower part of FIG. 16 indicate the rotation angle of the driving pulley 53, serving as a driving member, from a rotation start position (recording start position of the recording head 52). The measurement of the color shift with this correction pattern indicates the color shifts in states of the driving pulley 53 separated in succession by 90° from a certain angular position. Consequently the measured color shift represents the color shift averaged over a turn of the driving pulley 53 and does not depend on the phase angle of the driving pulley 53 at the start of formation of the correction pattern.

The operator enters the five crossing points on the correction pattern in a similar manner as in the first embodiment. The CPU 17 calculates the color shifts from the information of the inputted crossing points, and determined the new timing Td of exposure by averaging the color shifts as in the second embodiment. This correcting method, taking the eccentricity of the driving pulley 53 into consideration, allows to minimize, in average over the entire image area, the color shift resulting from the eccentricity of the driving pulley 53 and synchronized with the rotation period thereof.

[Fifth embodiment]

Figure 20:
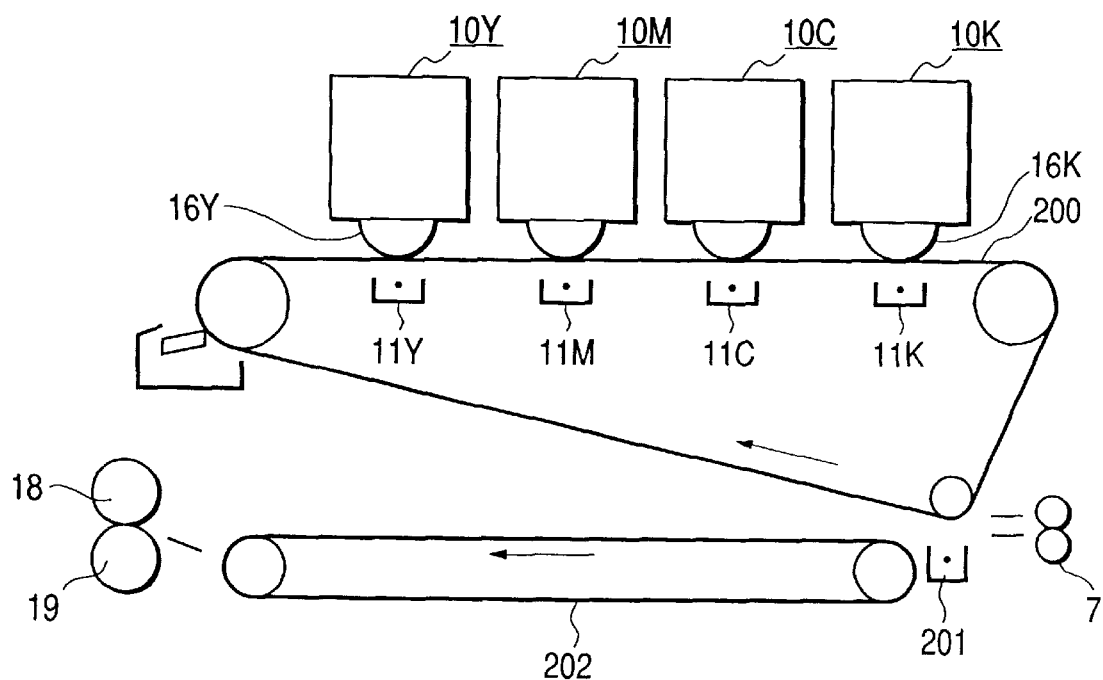
FIG. 20 is a schematic cross-sectional view of an image forming apparatus of the present invention.

The present invention is applicable also to a full-color image forming apparatus of the electrophotographic process as shown in FIG. 20, wherein components the same as those in FIGS. 1 and 2 are represented by the same numbers and will not be explained further.

Around an intermediate transfer belt 200, serving as an intermediate transfer member, there are provided image forming units 10Y, 10M, 10C and 10K serving as the image forming means. Toner images of different colors, formed by the image forming units, are electrostatically transferred by primary transfer chargers 11Y, 11M, 11C and 11K onto the intermediate transfer belt 200 in succession and in a mutually superposed manner. The toner images, transferred onto the intermediate transfer belt 200 in succession and in a mutually superposed manner, are electrostatically transferred in a collective manner by a secondary transfer charger 201 onto a recording sheet supplied at a predetermined timing. Subsequently the recording sheet is conveyed by a conveyor belt 202 to fixing units 18, 19 for fixing the toner images to the recording sheet, and is then discharged from the apparatus.

Also in such image forming apparatus, it is possible to easily and precisely correct the color shift by forming a correction pattern on a recording sheet, reading the value of the crossing point of the recorded lines and entering such value in the operation unit 108, as in the foregoing embodiments.

As explained in the foregoing, the above-described embodiments allow the operator to easily and precisely correct the color shift generated in the course of use of the image forming apparatus.

Though the color shift visually recognizable by the operator is in the order of 200 μm, the method of utilizing the correction pattern of the present invention allows to recognize the color shift of several ten micrometers, including the reading error, whereby the correction of the color shift can be achieved with a higher precision. It is also possible to prevent the increase in cost of the image forming apparatus since there is not required means for detecting the output image or the anticipated color shift. It is also possible, in the course of use of the apparatus, to always suppress the color shift thereby avoiding the deterioration of the image quality.

It is furthermore possible, by measuring the color shift at plural points, to reduce the color shift component resulting from the eccentricity of the photosensitive drums or the driving pulleys specific to each image forming apparatus, thereby minimizing the color shift in average over the entire image area.

The present invention may be applied to a system consisting of plural equipment (for example host computer, interface devices, reader, printer etc.) or an apparatus consisting of a single equipment (such as a copying machine or a facsimile apparatus).

Also the objects of the present invention are naturally attained by supplying the above-mentioned system or apparatus with a memory medium storing program codes of a software for realizing the functions of the aforementioned embodiments and reading and executing the program codes stored in the memory medium by a computer (or CPU or MPU) of such system or apparatus. In such case the program codes themselves read from the memory medium realize the functions of the aforementioned embodiments, and the memory medium storing such program codes constitutes the present invention. The present invention includes not only a case in which the functions of the aforementioned embodiments are realized by the execution of the read program codes by the computer but also a case in which an operating system functioning on the computer executes the actual process or a part thereof according to the instructions of such program codes, and the functions of the aforementioned embodiments are realized by such process.

The present invention naturally includes further a case wherein the supplied program codes are once stored in a function expansion board of the computer or a memory provided in a function expansion unit connected to the computer, and a CPU or the like provided in the function expansion board or the function expansion unit executes all the process or a part thereof according to the instructions of such program codes, thereby realizing the functions of the aforementioned embodiments.

What is claimed is:

1. An image forming apparatus comprising:
   first and second image forming means for respectively forming and superimposing an image of a first color and an image of a second color on a recording material,
   wherein said image forming apparatus has a mode in which said first image forming means forms a line of said first color on a recording material and said second image forming means forms a line of said second color on the recording material so that the line of said first color and the line of said second color cross each other without running at right angles to one another,
   wherein, in said mode, the recording material on which the line of said first color and the line of said second color have been formed is discharged outside a main body of said image forming apparatus;
   input means to which information on an intersecting point of the line of said first color and the line of said second color on the recording material which has been discharged is inputted; and
   adjustment means for adjusting a relative position of the image of said first color and the image of said second color on the recording material, based on said information inputted to said input means.

2. An image forming apparatus according to claim 1, wherein, in said mode, the line of said first color is calibrated with graduations at a predetermined scale resolution.

3. An image forming apparatus according to claim 2, wherein letters corresponding to said graduations are formed on the recording material.

4. An image forming apparatus according to claim 3, wherein said letters are numerals.

5. An image forming apparatus according to claim 1, wherein the smaller one of the angles between the line of said first color and the line of said second color does not exceed 45°.

6. An image forming apparatus according to claim 1, wherein the line of said first color is formed along a first direction substantially perpendicular to a conveying direction of the recording material, and said adjustment means adjusts, based on said information, the relative position of the image of said first color and the image of said second color in said first direction on the recording material.

7. An image forming apparatus according to claim 1, wherein the line of said first color is formed along a second direction substantially parallel to a conveying direction of the recording material, and said adjustment means adjusts, based on said information, the relative position of the image of said first color and the image of said second color in said second direction on the recording material.

8. An image forming apparatus according to claim 1, wherein said first and said second image forming means are provided with a first and a second rotatable image bearing members, respectively, and images on said first and said second image bearing members are sequentially transferred and superimposed on the recording material supported by a recording material supporting member.

9. An image forming apparatus according to claim 1, wherein said first and said second image forming means are provided with a first and a second rotatable image bearing members, respectively, and images on said first and said second image bearing members are sequentially transferred and superimposed on an intermediate transfer member, and the images on said intermediate transfer member are transferred onto the recording material.

10. An image forming apparatus according to claim 8 or 9, wherein during one revolution of each of said first and said second image bearing members and every time a predetermined period of time is elapsed, the line of said first color and the line of said second color are formed in plural positions on said first and said second image bearing members, respectively, and said adjustment means adjusts the relative position of the image of said first color and the image of said second color on the recording material in a second direction substantially parallel to a conveying direction of the recording material, based on an averaged result of information on a plurality of intersecting points.

11. An image forming apparatus according to claim 8 or 9, wherein said first and said second image forming means include first exposure means for exposing said first image bearing member and second exposure means for exposing said second image bearing member, respectively, and said adjustment means adjusts an exposures timing of said second exposure means based on said information.

12. An image forming apparatus according to claim 1, further comprising third and fourth image forming means for respectively forming an superimposing an image of a third color and an image of a fourth color on the recording material;
   wherein, in said mode, said third and said fourth image forming means form a line of said third color and a line of said fourth color on the recording material so that the line of said third color and line of said fourth color cross the line of said first color without running at right angles to the line of said first color.

13. An image forming apparatus according to claim 12, wherein information on an intersecting point of the line of said first color and the line of said third color and an intersecting point of the line of said first color and the line of said fourth color on the recording material which has been discharged are inputted to said input means.

14. An image forming apparatus according to claim 13, wherein said adjustment means adjusts, based on said information inputted to said input means, a relative position of the image of said first color and the image of said third color and a relative position of the image of said first color and the image of said fourth color.

15. An image forming apparatus according to any one of claims 12, 13 or 14, wherein said first color, said second color said third color and said fourth color are black, magenta, cyan and yellow, respectively.

16. An image forming apparatus according to claim 15, wherein aid adjustment means adjusts the relative positions of the line of said second, said third and said fourth colors with reference to the line of said first color.

17. An image forming apparatus according to claim 16, wherein the line of said second color, the line of said third color and the line of said fourth color respectively cross a single line of said first color.

18. An image forming apparatus according to claim 16, wherein a plurality of lines of said first color are formed on the recording material to cross the line of said second color, the line of said third color and the line of said fourth color.

19. An image forming apparatus according to claim 16, wherein the line of said first color, the line of said second color, the line of said third color and the line of said fourth color are formed on a single recording material.

20. Am image forming apparatus according to claim 1, wherein said first and said second image forming means include a first and a second recording heads for respectively discharging inks of said first and said second colors for forming the images of said first and said second colors, and the image of the links of said first and said second colors are formed on the recording material by said first and said second recording heads in a superposed manner.

21. An image forming apparatus according to claim 20, further comprising a rotatable driving member for displacing said first and said second recording heads in a direction perpendicular to a conveying direction of the recording material, wherein the line of said first color and the line of said second color are formed in plural sets on the recording material during one turn of said rotatable driving member, and said adjustment means adjusts the relative position of the image of said first color and the image of said second color on the recording material, based on an average result of information on a plurality of intersecting points.

22. An image forming apparatus according to claim 21, wherein the line of said first color and the line of said second color are formed in plural sets at a predetermined interval on the recording material during one turn of said rotatable driving member, and said adjustment means adjusts the relative position of the image of said first color and the image of said second color on the recording material, based on an averaged result of information on a plurality of intersecting points.

23. An image forming apparatus according to claim 20, wherein said adjustment means adjusts timing of ink discharge from said first and said second recording heads.

24. An adjustment method for adjusting a relative position of an image of a first color and an image of a second color formed on a recording material by first image forming means and second image forming means, the method comprising the steps of:
forming a line of said first color by said first image forming means on the recording material;
forming a line of said second color by said second image forming means on the recording material so that the line of said first color and the line of said second color cross each other without running at right angles to one another;
discharging the recording material on which the line of said first color and the line of said second color have been formed outside a main body of an image forming apparatus; and
adjusting the relative position of the image of said first color and the image of said second color on the recording material, based on information on an intersecting point of the line of said first color and the line of said second color on the recording material which has been discharged.

25. An adjustment method according to claim 24, wherein the line of said first color is calibrated with graduations at a predetermined scale resolution.

26. An adjustment method according to claim 25, wherein letters corresponding to said graduations are formed on the recording material.

27. An adjustment method according to claim 26, wherein said letters are numerals.

28. An adjustment method according to claim 24, wherein the smaller one of the angles between the line of said first color and the line of said second color does not exceed 45°.

29. An adjustment method according to claim 24, wherein the line of said first color is formed along a first direction substantially perpendicular to a conveying direction of the recording material, and the relative position of the image of said first color and the image of said second color in said first direction on the recording material is adjusted based ons aid information.

30. An adjustment method according to claim 24, wherein the line of said first color is formed along a second direction substantially parallel to a conveying direction of the recording material, and the relative position of the image of said first color and the image of said second color in said second direction on the recording material is adjusted based on said information.

31. An adjustment method according to claim 24, wherein said first and said second image forming means are provided with a first and a second rotatable image bearing members, respectively, and images on said first and said second image bearing members are sequentially transferred and superimposed on the recording material supported by a recording material supporting member.

32. An adjustment method according to claim 24, wherein said first and said second image forming means are provided with a first and a second rotatable image bearing members, respectively, and images on said first and said second image bearing members are sequentially transferred and superimposed on an intermediate transfer member, and the images on said intermediate transfer member are transferred onto the recording material.

33. An adjustment method according to claim 31 or 32, wherein during one revolution of each of said first and said second image bearing members and every time a predetermined period of time is elapsed, the line of said first color and the line of said second color are formed in plural positions on said first and said second image bearing members, respectively, and the relative position of the image of said first color and the image of said second color on the recording material in a second direction substantially parallel to a conveying direction of the recording material, based on an averaged result of the information on a plurality of intersecting points.

34. An adjustment method according to claim 31 or 32, wherein said first and said second image forming means include first exposure means for exposing said first image bearing member and second exposure means for exposing said second image bearing member, respectively, and an exposure timing of said second exposure means is adjusted based on said information.

35. An adjustment method according to claim 24, further comprising the steps of:
forming a line of a third color by third image forming means on the recording material so that the line of said first color and the line of said third color cross each other without running at right angles to one anther; and
forming a line of a fourth color by fourth image forming means on the recording material so that the line of said first color and the line of said fourth color cross each other without running at right angles to one another.

36. An adjustment method according to claim 35, wherein, based on information on an intersecting point of the line of said first color and the line of said third color and an intersecting point of the line of said first color and the line of said fourth color on the recording material which has been discharged, a relative position of the image of said first color and an image of said third color and a relative position of the image of said first color and an image of said fourth color are adjusted.

37. An adjustment method according to claim 35 or 36, wherein said first color, said second color, said third color and said fourth color are black, magenta, cyan and yellow, respectively.

38. An adjustment method according to claim 37, wherein the relative potions of the lines of said second, said third and said fourth colors are adjusted with reference to the line of said first color.

39. An adjustment method according to claim 38, wherein the line of said second color, the line if said third color and the line of said fourth color respectively cross a single line of said first color.

40. An adjustment method according to claim 38, wherein a plurality of lines of said first color are formed on the recording material to cross the line of said second color, the line of said third color and the line of said fourth color.

41. An adjustment method according to claim 38, wherein the line of said first color, the line of said second color, the line of said third color and the line of said fourth color are formed on a single recording material.

42. An adjustment method according to claim 24, wherein said first and said second image forming means include a first and a second recording heads for respectively discharging inks of said first and said second colors for forming the images of said first and said second colors, and the images of the inks of said first and said second colors are formed on the recording material by said first and said second recording heads in a superposed manner.

43. An adjustment method according to claim 42, wherein, during one turn of a rotatable driving member for displacing said first and said second recording heads in a direction perpendicular to a conveying direction of the recording material, the line of said first color and the line of said second color are formed in plural sets on the recording material, and said adjusting step adjusts the relative position of the image of said first color and the image of said second color on the recording material, based on an averaged result of information of a plurality of intersecting points of the lines of said first color and the lines of said second color.

44. An adjustment method according to claim 43, wherein the line of said first color and the line of said second color are formed in plural sets at a predetermined interval on the recording material during one turn of said rotatable driving member, and said adjusting step adjusts the relative position of the image of said first color and the image of said second color on recording material, based on an averaged result of information of a plurality of intersecting points of the lines of said first color and the lines of said second color.

45. An adjustment method according to claim 42, wherein said adjusting step adjusts timing of ink discharge from said first and said second recording heads.

46. A computer-readable memory medium storing program codes for adjusting a relative position of an image of a first color and an image of a second color formed on a recording material by a first image forming means and a second image forming means, the medium comprising the codes of:

forming a line of said first color by said first image forming means on the recording material;

forming a line of said second color by said second image forming means on the recording material so that the line of said first color and the line of said second color cross each other without running at right angles to one another;

discharging the recording material on which the line of said first color and the line of said second color have been formed outside a main body of an image forming apparatus; and adjusting the relative position of the image of said first color and the image of said second color on the recording material, based on information on an intersecting point of the line of said first color and the line of said second color on the recording material which has been discharged.

* * * * *

UNITED STATES PATENT AND TRADEMARK OFFICE
CERTIFICATE OF CORRECTION

PATENT NO. : 6,335,747 B1
DATED : January 1, 2002
INVENTOR(S) : Atsushi Munakata It is certified that error appears in the above-identified patent and that said Letters Patent is hereby corrected as shown below:

Column 1,
Line 20, "to" should read -- to be --.

Column 2,
Line 42, "correcting" should read -- correctly --.

Column 6,
Line 22, "100)≡–0.357 ms." should read -- 100) ≅ –0.357 ms. --.

Column 7,
Line 6, "angle" should read -- angles --;
Line 42, "However" should read -- However, --;
Line 59, "length" should read -- lengths --.

Column 9,
Line 49, "recording" should read -- record --;
Line 66, "determined" should read -- determines --.

Column 12,
Line 36, "exposures" should read -- exposure --;
Line 40, "forming an" should read -- forming and --;
Line 64, "color said" should read -- color, said --;
Line 67, "aid" should read -- said --.

Column 13,
Line 14, "Am" should read -- An --;
Line 31, "average" should read -- averaged --.

Column 14,
Line 16, "ons aid" should read -- on said --;
Line 64, "anther;" should read -- another; --.

UNITED STATES PATENT AND TRADEMARK OFFICE
CERTIFICATE OF CORRECTION

PATENT NO. : 6,335,747 B1
DATED : January 1, 2002
INVENTOR(S) : Atsushi Munakata It is certified that error appears in the above-identified patent and that said Letters Patent is hereby corrected as shown below:

Column 15,
Line 17, "potions" should read -- positions --;
Line 21, "if" should read -- of --.

Column 16,
Line 13, "recording" should read -- the recording --.

Signed and Sealed this

Eleventh Day of February, 2003

JAMES E. ROGAN
*Director of the United States Patent and Trademark Office*